United States Patent
Gouko et al.

(10) Patent No.: US 10,578,496 B2
(45) Date of Patent: Mar. 3, 2020

(54) STATE DETECTION SENSOR

(71) Applicant: DENSO CORPORATION, Kariya, Aichi-pref. (JP)

(72) Inventors: Norio Gouko, Kariya (JP); Atusi Sakaida, Kariya (JP); Toshihisa Taniguchi, Kariya (JP); Keiji Okamoto, Kariya (JP); Yoshihiko Shiraishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 412 days.

(21) Appl. No.: 15/329,272

(22) PCT Filed: Oct. 2, 2015

(86) PCT No.: PCT/JP2015/005026
§ 371 (c)(1),
(2) Date: Jan. 26, 2017

(87) PCT Pub. No.: WO2016/063465
PCT Pub. Date: Apr. 28, 2016

(65) Prior Publication Data
US 2017/0211990 A1  Jul. 27, 2017

(30) Foreign Application Priority Data
Oct. 20, 2014 (JP) ................... 2014-213680

(51) Int. Cl.
*G01K 3/14* (2006.01)
*G01K 3/08* (2006.01)
(Continued)

(52) U.S. Cl.
CPC ............. *G01K 3/14* (2013.01); *G01K 3/08* (2013.01); *G01K 17/00* (2013.01); *G01K 17/20* (2013.01)

(58) Field of Classification Search
CPC ............................................. G01K 17/00–20
(Continued)

(56) References Cited

U.S. PATENT DOCUMENTS

| 6,994,468 B2* | 2/2006 | Thery ............... G01J 5/12 136/225 |
| 2007/0181650 A1* | 8/2007 | Yoo ............... G01K 17/20 228/101 |
| 2015/0144171 A1* | 5/2015 | Taniguchi ............ H01L 23/38 136/205 |

FOREIGN PATENT DOCUMENTS

| DE | 102006016956 | * 10/2007 |
| JP | S61013121 A | 1/1986 |

(Continued)

*Primary Examiner* — Lisa M Caputo
*Assistant Examiner* — Janice M Soto
(74) *Attorney, Agent, or Firm* — Harness, Dickey & Pierce, P.L.C.

(57) ABSTRACT

A first heat flux sensor, which outputs a first sensor signal according to a heat flux passing therethrough, a second heat flux sensor, which outputs a second sensor signal according to a heat flux passing therethrough, a thermal buffer body, which has a predetermined heat capacity, and a heat releasing body, which has a predetermined heat capacity, are provided, and the first heat flux sensor, the thermal buffer body, the second heat flux sensor and the heat releasing body are arranged in this order from a sensing subject side. The first sensor signal, which corresponds to the heat flux between the sensing subject and the thermal buffer body, is outputted from the first heat flux sensor, and the second sensor signal, which corresponds to the heat flux between the thermal buffer body and the heat releasing body, is outputted from the second heat flux sensor.

10 Claims, 18 Drawing Sheets

(51) Int. Cl.
*G01K 17/20* (2006.01)
*G01K 17/00* (2006.01)

(58) Field of Classification Search
USPC .................................... 374/29, 44, 137, 110
See application file for complete search history.

(56) References Cited

FOREIGN PATENT DOCUMENTS

| | | | |
|---|---|---|---|
| JP | H09200918 A | | 7/1997 |
| JP | 201117485 | * | 9/2011 |
| JP | 2011187619 A | | 9/2011 |

* cited by examiner

STATE DETECTION SENSOR

CROSS REFERENCE TO RELATED APPLICATIONS

This application is a U.S. National Phase Application under 35 U.S.C. 371 of International Application No. PCT/JP2015/005026 filed on Oct. 2, 2015 and published in Japanese as WO 2016/063465 A1 on Apr. 28, 2016. This application is based on and claims the benefit of priority from Japanese Patent Application No. 2014-213680 filed on Oct. 20, 2014. The entire disclosures of all of the above applications are incorporated herein by reference.

TECHNICAL FIELD

The present disclosure relates to a state detection sensor that senses a state of a sensing subject.

BACKGROUND ART

There has been proposed an abnormality determining device that determines abnormal heating of a sensing subject based on a sensor signal outputted from a state detection sensor, which detects a state of the sensing subject (see, for example, the patent literature 1). That is, the abnormality determining device includes the state detection sensor that has a temperature sensor, which senses a temperature of a surface of an upper portion of the sensing subject, and a temperature sensor, which senses a temperature of a surface of a lower portion of the sensing subject. The sensing subject is a subject that generates convection through the heat generation. The abnormality determining device determines presence of the abnormal heating of the sensing subject based on a temperature difference between the temperature of the surface of the upper portion and the temperature of the surface of the lower portion of the sensing subject.

However, in this type of state detection sensor, the temperature sensors are exposed to the surrounding atmosphere, so that this type of state detection sensor is susceptible to the influence of the temperature change caused by the surrounding atmosphere. Therefore, in the above-described state detection sensor, there is a disadvantage of that the temperature (state) of the sensing subject may not be accurately sensed depending on the state of the surrounding atmosphere. In the abnormality determining device, which uses this type of state detection sensor, since the temperature (state) of the sensing subject cannot be accurately sensed with the state detection sensor, the abnormality determination of the sensing subject may not be accurately executed in some cases.

CITATION LIST

Patent Literature

Patent Literature 1: JPH09-200918A

SUMMARY OF THE INVENTION

The present disclosure is made in view of the above point. It is an objective of the present disclosure to provide a state detection sensor that can limit deterioration of a sensing accuracy regardless of a state of surrounding atmosphere.

In order to achieve the above objective, according to the present disclosure, there is provided a state detection sensor that outputs a sensor signal, which corresponding to a state of a sensing subject, the state detection sensor including: a first heat flux sensor that outputs a first sensor signal, wherein the first sensor signal corresponds to a heat flux, which passes through the first heat flux sensor; a second heat flux sensor that outputs a second sensor signal, wherein the second sensor signal corresponds to a heat flux, which passes through the second heat flux sensor; a thermal buffer body that has a predetermined heat capacity; and a heat releasing body that has a predetermined heat capacity, wherein: the first heat flux sensor, the thermal buffer body, the second heat flux sensor and the heat releasing body are arranged in this order from the sensing subject side; the first heat flux sensor outputs the first sensor signal, which corresponds to the heat flux between the sensing subject and the thermal buffer body; and the second heat flux sensor outputs the second sensor signal, which corresponds to the heat flux between the thermal buffer body and the heat releasing body.

With the above construction, the first heat flux sensor, the thermal buffer body having the predetermined heat capacity, the second heat flux sensor and the heat releasing body having the predetermined heat capacity are arranged in this order from the sensing subject side. Therefore, it is possible to limit an influence of a change in the atmosphere, which is caused by the release or accumulation of the heat at the heat releasing body exposed to the atmosphere, to the first and second heat flux sensors. Furthermore, the thermal buffer body having the predetermined heat capacity is placed between the first heat flux sensor and the second heat flux sensor. Therefore, in the case where the abnormal heating of the sensing subject is absent, the heat flux, which passes through the first heat flux sensor, and the heat flux, which passes through the second heat flux sensor, are equal to each other. In contrast, in the case where the abnormal heating of the sensing subject is present, the heat flux, which passes through the first heat flux sensor, and the heat flux, which passes through the second heat flux sensor, momentarily become different from each other (see FIGS. 7A and 7B). Thus, according to the present disclosure, it is possible to output the sensor signal that corresponds to the state of the sensing subject regardless of the state of the atmosphere, and it is possible to limit deterioration of the sensing accuracy.

DESCRIPTION OF EMBODIMENTS

Hereinafter, various embodiments of the present disclosure will be described with reference to the drawings. In the following respective embodiments, portions, which are identical or equivalent to each other, will be indicated with the same reference signs.

First Embodiment

A first embodiment of the present disclosure will be described with reference to the drawings. In the present embodiment, there will be described an example of an abnormality determining device, which determines an abnormal heat generation (state) of a cutting device through use of a state detection sensor of the present disclosure.

Figure 1:
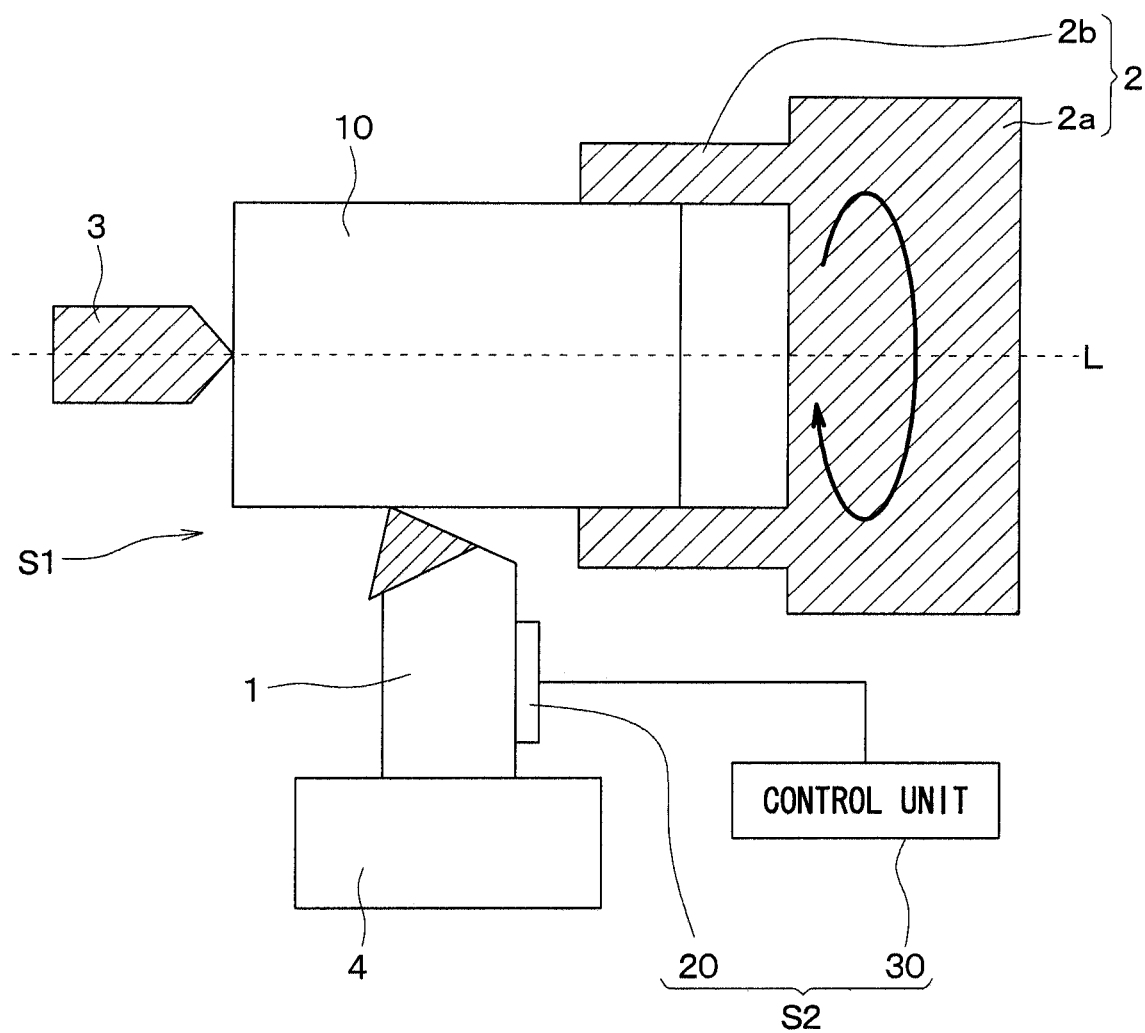
FIG. 1 is a schematic diagram showing an abnormality determining device, which includes a state detection sensor of a first embodiment of the present disclosure and is installed to a cutting device.

As shown in FIG. 1, the cutting device S1 includes a blade 1 and a pair of first and second jigs 2, 3. In the present embodiment, the blade 1 is fixed to a support member 4. The first jig 2 includes a main body 2a and three holding portions 2b (only two of the holding portions 2b are shown in FIG. 1), which project from the main body 2a in a common direction. A processing subject member 10 is clamped with the three holding portions 2b. The second jig 3 is placed on an opposite side of the processing subject member 10, which is opposite from the side where the processing subject member 10 is clamped by the first jig 2, such that the second jig 3 cooperates with the first jig 2 to fix the processing subject member 10.

In the cutting device S1, the processing subject member 10 is fixed with the first and second jigs 2, 3, and the processing subject member 10 is rotated together with the first and second jigs 2, 3 about an axial direction L that is parallel with the projecting direction of the holding portions 2b of the first jig 2 and extends through a center of the main body 2a, and at the same time, the processing subject member 10 is brought into contact with the blade 1 to cut the processing subject member 10 with the blade 1.

The abnormality determining device S2 includes a state detection sensor (state detection device) 20 and a control unit (control device) 30. The state detection sensor 20 is installed to the blade 1.

Figure 2:
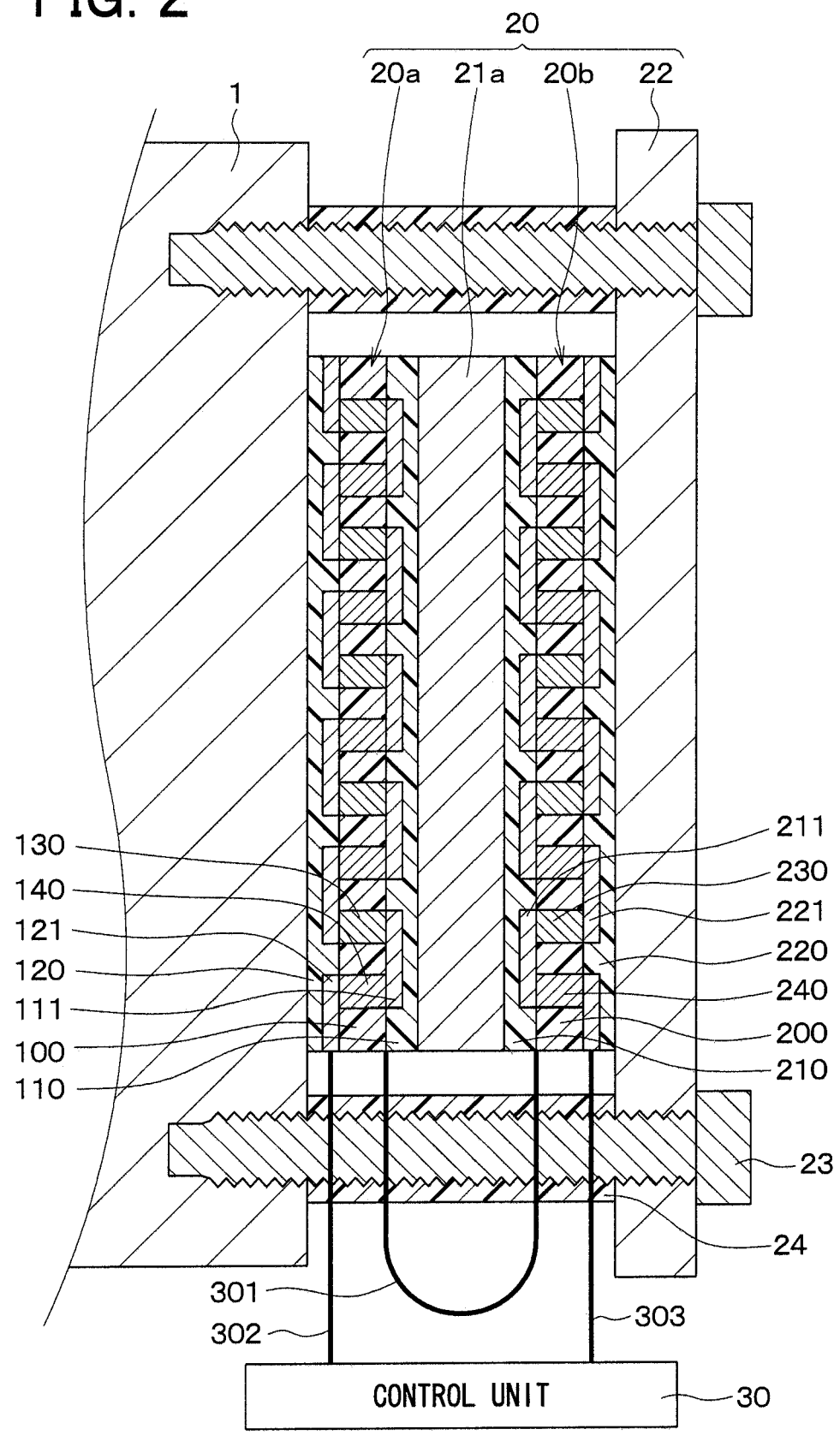
FIG. 2 is a cross sectional view showing a structure of a state detection sensor indicated in FIG. 1.

As shown in FIG. 2, the state detection sensor 20 includes first and second heat flux sensors 20a, 20b, a thermal buffer body 21a and a heat releasing body 22. First of all, the structure of the first and second heat flux sensors 20a, 20b will be described with reference to FIGS. 3 to 5. The first and second heat flux sensors 20a, 20b have an identical structure. Therefore, only the structure of the first heat flux sensor 20a will be described as an example. However, each reference sign in parentheses in FIGS. 3 to 5 corresponds to a corresponding reference sign of the second heat flux sensor 20b.

Figure 3:
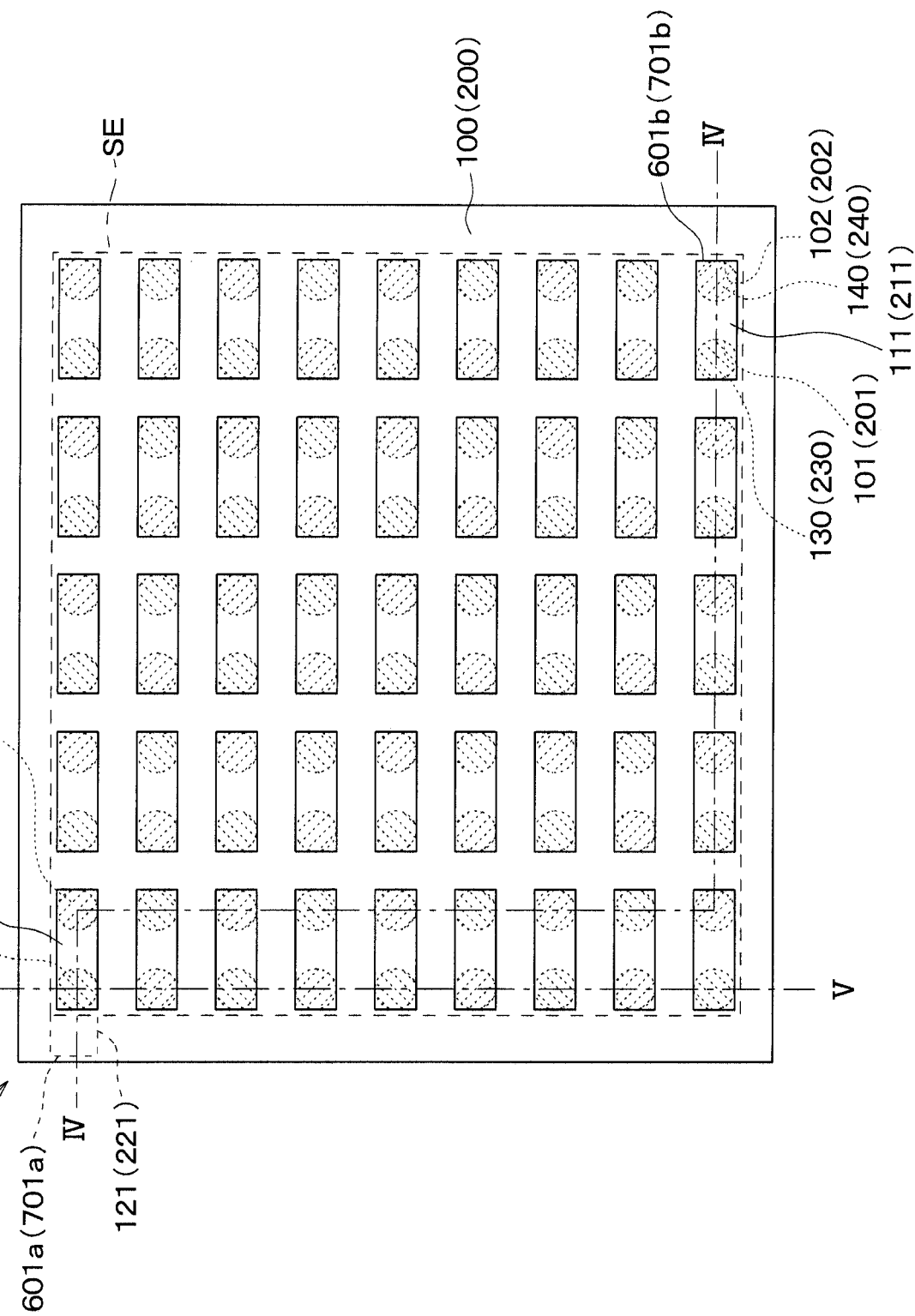
FIG. 3 is a plan view showing a structure of respective first and second heat flux sensors.
Figure 4:
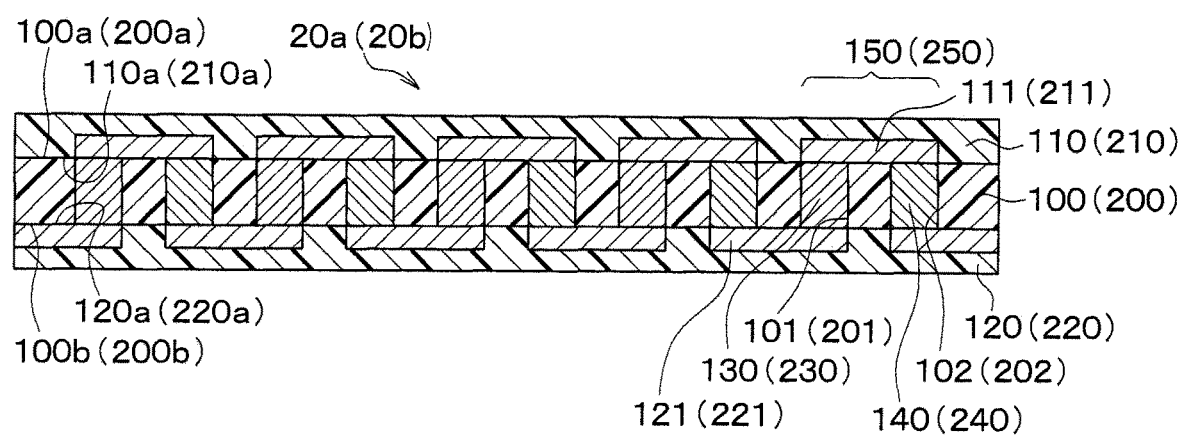
FIG. 4 is a cross sectional view taken along line IV-IV in FIG. 3.
Figure 5:
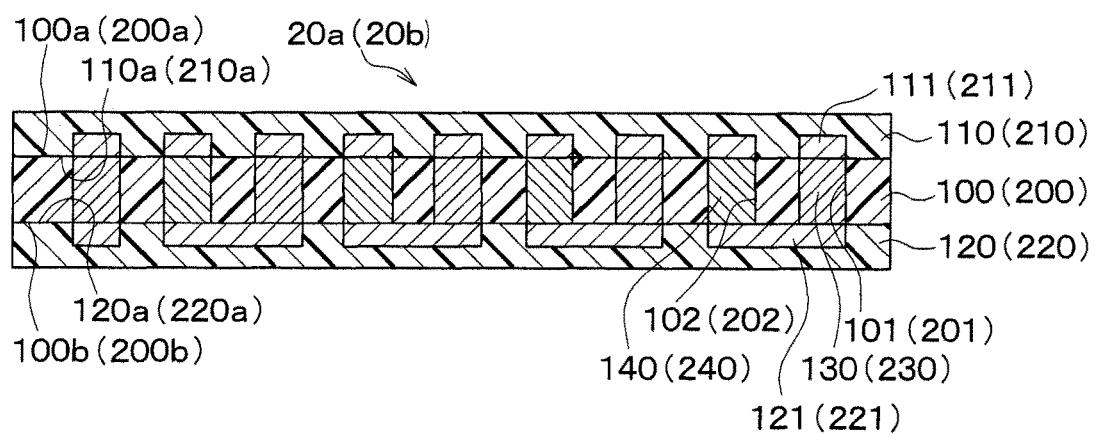
FIG. 5 is a cross sectional view taken along line V-V in FIG. 3.

In the first heat flux sensor 20a, as shown in FIGS. 3 to 5, a dielectric substrate 100, a front surface protective member 110 and a back surface protective member 120 are formed integrally into a one-piece body, and primary and secondary interlayer connecting members 130, 140 are alternately connected in series in an inside of this integrated one-piece body. In FIG. 3, the front surface protective member 110 is omitted for the sake of easy understanding.

In the present embodiment, the dielectric substrate 100 is a planar rectangular film made of thermoplastic resin, such as poly ether ether ketone (PEEK), poly ether imide (PEI), or liquid crystal polymer (LCP). A plurality of primary via holes 101 and a plurality of secondary via holes 102 extend through the dielectric substrate 100 in a thickness direction of the dielectric substrate 100, which is perpendicular to a plane of the dielectric substrate 100. The primary via holes 101 and the secondary via holes 102 are arranged in a hound's-tooth check pattern such that the primary via holes 101 and the secondary via holes 102 are alternately arranged one after another.

Each of the primary and secondary via holes 101, 102 is shaped into a cylindrical form that has a constant diameter from a front surface 100a to a back surface 100b of the dielectric substrate 100. Alternatively, each of the primary and secondary via holes 101, 102 may be shaped into a tapered form that has a progressively decreasing diameter from the front surface 100a to the back surface 100b. Further alternatively, each of the primary and secondary via holes 101, 102 may be shaped into a tapered form that has a progressively decreasing diameter from the back surface 100b toward the front surface 100a. Further alternatively, each of the primary and secondary via holes 101, 102 may be shaped into a square tube form.

Each of the primary interlayer connecting members 130 is placed in an inside of a corresponding one of the primary via holes 101, and each of the secondary interlayer connecting members 140 is placed in an inside of a corresponding one of the secondary via holes 102. That is, the primary interlayer connecting members 130 and the secondary interlayer connecting members 140 are alternately arranged one after another in the dielectric substrate 100.

Each primary interlayer connecting member 130 and each secondary interlayer connecting member 140 are made of different types of electrically conductive metals, so that a Seebeck effect is exerted therebetween. For example, the primary interlayer connecting member 130 is made of an intermetallic compound (sintered alloy) that is formed by solid-state sintering of P-type Bi—Sb—Te alloy powder that is sintered in such a manner that a crystalline structure of metal atoms before the solid-state sintering is maintained after the solid-state sintering. Furthermore, the secondary interlayer connecting member 140 is made of an intermetallic compound that is formed by solid-state sintering of N-type Bi—Te alloy powder that is sintered in such a manner that a crystalline structure of metal atoms before the sintering is maintained after the solid-state sintering. When the above-described intermetallic compounds, which are formed by the solid-state sintering in a manner that maintains the predetermined crystalline structure, are used as the primary and secondary interlayer connecting members 130, 140, an electromotive voltage can be increased.

Although FIG. 3 is not a cross sectional view, a hatching is applied to the primary and secondary interlayer connecting members 130, 140 to ease understanding.

A front surface protective member 110 is placed on the front surface 100a of the dielectric substrate 100. The front surface protective member 110 is a planar rectangular film made of thermoplastic resin, such as poly ether ether ketone (PEEK), poly ether imide (PEI), or liquid crystal polymer (LCP). The planar form of the front surface protective member 110 has the same size as the planar form of the dielectric substrate 100. Patterning of, for example, copper foil is applied to one surface 110a of the front surface protective member 110, which is opposed to the dielectric substrate 100, so that a plurality of front surface patterns (a plurality of front surface conductor portions) 111, which have electrical conductivity, is formed on the one surface 110a such that the front surface patterns 111 are spaced from each other. Each corresponding one of the front surface patterns 111 is electrically connected to the corresponding primary and secondary interlayer connecting members 130, 140.

Specifically, as shown in FIG. 4, each of the primary interlayer connecting members 130 and an adjacent one of the secondary interlayer connecting members 140, which is adjacent to this primary interlayer connecting member 130, form a set 150. In this case, the primary interlayer connecting member 130 and the secondary interlayer connecting member 140 of each set 150 are joined to a corresponding common one of the front surface patterns 111. That is, the primary and secondary interlayer connecting members 130, 140 of each set 150 are electrically connected to each other through the common front surface pattern 111. In the present embodiment, the corresponding primary interlayer connecting member 130 and the corresponding secondary interlayer connecting member 140, which are adjacent to each other in a longitudinal direction of the dielectric substrate 100 (a left-to-right direction in FIG. 4), form the set 150.

A back surface protective member 120 is placed on the back surface 100b of the dielectric substrate 100. The back surface protective member 120 is a planar rectangular film made of thermoplastic resin, such as poly ether ether ketone (PEEK), poly ether imide (PEI), or liquid crystal polymer (LCP). The planar form of the back surface protective member 120 has the same size as the planar form of the dielectric substrate 100. Patterning of, for example, copper foil is applied to one surface 120a of the back surface protective member 120, which is opposed to the dielectric substrate 100, so that a plurality of back surface patterns (a plurality of back surface conductor portions) 121, which have electrical conductivity, is formed on the one surface 120a such that the back surface patterns 121 are spaced from each other. Each corresponding one of the back surface patterns 121 is electrically connected to the corresponding primary and secondary interlayer connecting members 130, 140.

Specifically, as shown in FIG. 4, with respect to adjacent two of the sets 150, which are adjacent to each other in the longitudinal direction of the dielectric substrate 100, the primary interlayer connecting member 130 of one of the adjacent sets 150 and the secondary interlayer connecting member 140 of another one of the adjacent sets 150 are joined to a corresponding common one of the back surface patterns 121. That is, the primary interlayer connecting member 130 of the one set 150 and the secondary interlayer connecting member 140 of the other set 150 are electrically connected to each other through the common back surface pattern 121.

Furthermore, as shown in FIG. 5, at each corresponding outer edge of the dielectric substrate 100, each corresponding primary interlayer connecting member 130 and the corresponding secondary interlayer connecting member 140, which are adjacent to each other in a direction (a top-to-bottom direction in FIG. 3) that is perpendicular to the longitudinal direction, are joined to the corresponding common back surface pattern 121. Specifically, the adjacent primary and secondary interlayer connecting members 130, 140 are joined to the common back surface pattern 121 at the outer edge of the dielectric substrate 100 such that a row of the primary and secondary interlayer connecting members 130, 140, which are connected in series by the corresponding front surface patterns 111 and the corresponding back surface patterns 121 in the longitudinal direction of the dielectric substrate 100, are turned at the outer edge of the dielectric substrate 100 to form another row of the primary and secondary interlayer connecting members 130, 140, which are connected in series by the front surface patterns 111 and the back surface patterns 121 in the longitudinal direction of the dielectric substrate 100, and so on.

The basic structure of the first heat flux sensor 20a of the present embodiment has been described. As discussed above, the structure of the second heat flux sensor 20b is similar to the structure of the first heat flux sensor 20a.

That is, in the second heat flux sensor 20b, a dielectric substrate 200, a front surface protective member 210 and a back surface protective member 220 are formed integrally into a one-piece body. Each of primary and secondary via holes 201, 202 is shaped into a cylindrical form that has a constant diameter from a front surface 200a to a back surface 200b of the dielectric substrate 200. Each of primary interlayer connecting members 230 is placed in an inside of a corresponding one of the primary via holes 201, and each of the secondary interlayer connecting members 240 is placed in an inside of a corresponding one of the secondary via holes 202. The planar form of the front surface protective member 210 has the same size as the planar form of the dielectric substrate 200. Patterning of, for example, copper foil is applied to one surface 210a of the front surface protective member 210, which is opposed to the dielectric substrate 200, so that a plurality of front surface patterns 211 is formed on the one surface 210a such that the front surface patterns 211 are spaced from each other. Each of the front surface patterns 211 is electrically connected to the corresponding first and second interlayer connecting members 230, 240. The planar form of the back surface protective member 220 has the same size as the planar form of the dielectric substrate 200. Patterning of, for example, copper foil is applied to one surface 220a of the back surface protective member 220, which is opposed to the dielectric substrate 200, so that a plurality of back surface patterns 221 is formed on the one surface 220a such that the back surface patterns 221 are spaced from each other. Each of the back surface patterns 221 is electrically connected to the corresponding first and second interlayer connecting members 230, 240. As shown in FIG. 4, each of the primary interlayer connecting members 230 and an adjacent one of the secondary interlayer connecting members 240, which is adjacent to this primary interlayer connecting member 230, form a set 250. In this case, the primary interlayer connecting member 230 and the secondary interlayer connecting member 240 of each set 250 are joined to a corresponding common one of the front surface patterns 211.

The first and second heat flux sensors 20a, 20b, which are constructed in the above-described manner, outputs a sensor signal (electromotive voltage), which corresponds to a heat flux that passes through the first and second heat flux sensors 20a, 20b in a thickness direction of the respective first and second heat flux sensors 20a, 20b. This is due to that an electromotive voltage, which is generated at the primary and secondary interlayer connecting members 130, 140 alternately arranged one after another and connected in series, is changed when the heat flux changes. The thickness direction of each of the first and second heat flux sensors 20a, 20b is a stacking direction of the dielectric substrate 100, the front surface protective member 110 and the back surface protective member 120 and is perpendicular to a plane of the dielectric substrate 100.

Now, a manufacturing method of the first heat flux sensor 20a will be described with reference to FIGS. 6(a) to 6(h). The manufacturing method of the second heat flux sensor 20b is similar to the manufacturing method of the first heat flux sensor 20a.

Figure 6A:
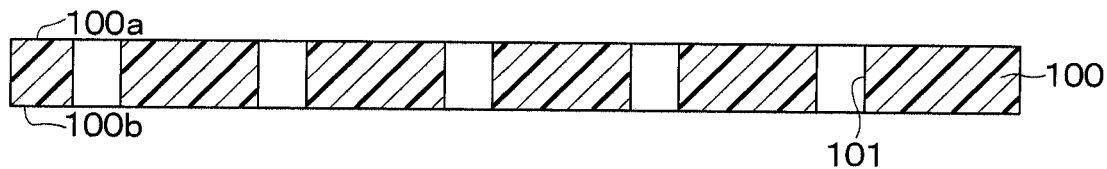
FIG. 6 is a cross sectional view showing manufacturing steps of the first heat flux sensor shown in FIG. 3.

First of all, as shown in FIG. 6(a), the dielectric substrate 100 is prepared, and the primary via holes 101 are formed in the dielectric substrate 100 through use of, for example, a drill or a laser light.

Figure 6B:
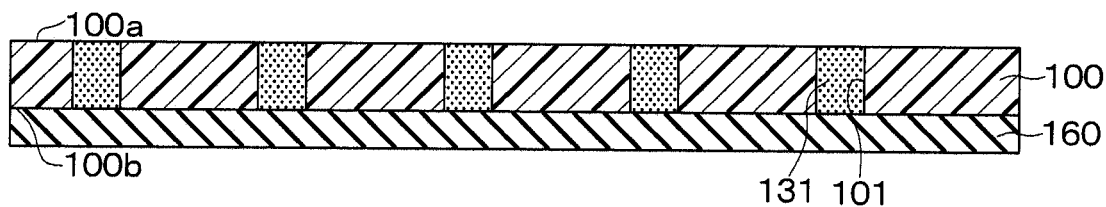

Next, as shown in FIG. 6(b), primary conductive paste 131 is filled into the respective primary via holes 101. As a method (device) for filling the primary conductive paste 131 into the primary via holes 101, a method (device) disclosed in Japanese patent application number 2010-50356 (JP2011-187619A), which is filed by the applicant of the present application, may be used.

This method will be briefly described. First of all, the dielectric substrate 100 is placed on a holder (not shown) through an adsorption paper 160 in such a manner that the back surface 100b is opposed to the adsorption paper 160. Then, the primary conductive paste 131, which is melted, is filled into the respective primary via holes 101. Thereby, a majority of organic solvent of the primary conductive paste 131 is adsorbed by the adsorption paper 160, so that the alloy powder is cohesively held in the respective primary via holes 101.

The adsorption paper 160 can be any paper that can adsorb the organic solvent of the primary conductive paste 131. For example, a typical woodfree paper may be used as the adsorption paper 160. Furthermore, the primary conductive paste 131 is prepared as follows. That is, the Bi—Sb—Te alloy powder, in which the metal atoms maintain the predetermined crystalline structure, is added into the organic solvent, such as paraffin, which has the melting point of 43 degrees Celsius, to form the paste that is used as the primary conductive paste 131. Thus, at the time of filling the primary conductive paste 131, the front surface 100a of the dielectric substrate 100 is heated to about 43 degrees Celsius.

Figure 6C:
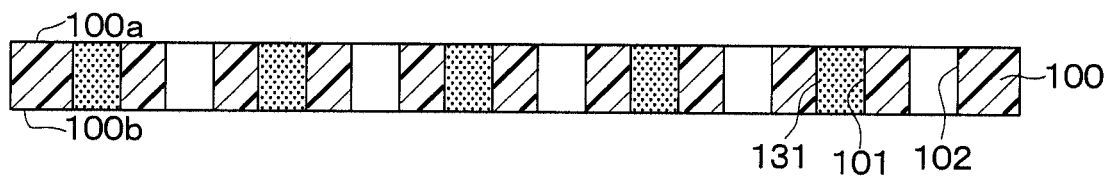

Next, as shown in FIG. 6(c), the secondary via holes 102 are formed in the dielectric substrate 100 through use of, for example, a drill or a laser light. As discussed above, the secondary via holes 102 and the primary via holes 101 are alternately arranged to form the hound's-tooth check pattern.

Figure 6D:
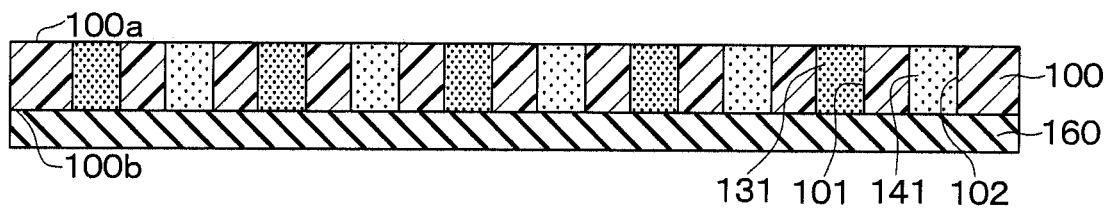

Next, as shown in FIG. 6(d), secondary conductive paste 141 is filled into the respective secondary via holes 102. This step can be executed in a manner similar to that of the step of FIG. 6(b).

Specifically, the dielectric substrate 100 is placed on the holder (not shown) through the adsorption paper 160 in such a manner that the back surface 100b is opposed to the adsorption paper 160. Then, the secondary conductive paste 141 is filled into the secondary via holes 102. Thereby, a majority of organic solvent of the secondary conductive paste 141 is adsorbed by the adsorption paper 160, so that the alloy powder is cohesively held in the respective secondary via holes 102.

The secondary conductive paste 141 is prepared as follows. That is, the Bi—Te alloy powder, in which the metal atoms maintain the predetermined crystalline structure that is different from that of the metal atoms of the primary conductive paste 131, is added into the organic solvent, such as terpene, which has the melting point of the room temperature, to form the paste that is used as the secondary conductive paste 141. Here, the organic solvent, which is used in the secondary conductive paste 141, has the melting temperature that is lower than the melting point of the organic solvent, which is used in the primary conductive paste 131. At the time of filling the secondary conductive paste 141, the front surface 100a of the dielectric substrate 100 is kept at the room temperature. In other words, the filling of the secondary conductive paste 141 is executed in a solidified state of the organic solvent, which is contained in the primary conductive paste 131. Thereby, intrusion of the secondary conductive paste 141 into the primary via holes 101 is limited.

The solidified state of the organic solvent, which is contained in the primary conductive paste 131, refers to the state of the organic solvent left in the primary via hole 101 without being adsorbed by the adsorption paper 160 at the step shown in FIG. 6(b).

Figure 6E:
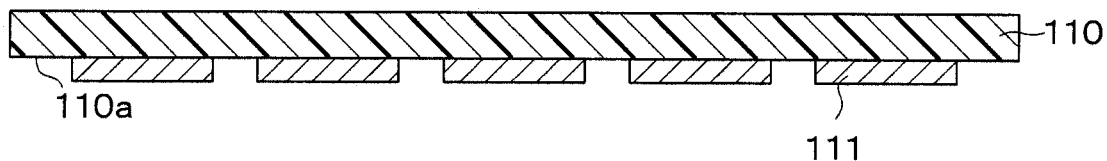
Figure 6F:
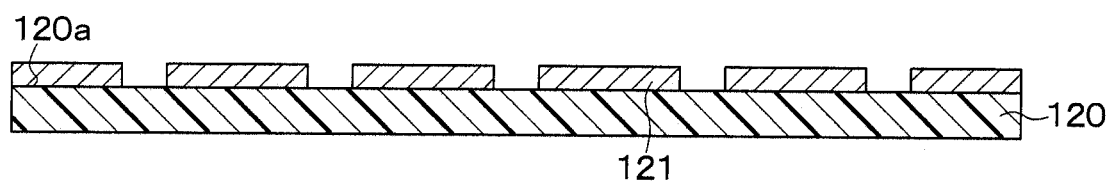

As a separate step, which is separately executed from the above respective steps, the copper foil or the like is formed on the one surface 110a of the front surface protective member 110 and the one surface 120a of the back surface protective member 120, which are opposed to the dielectric substrate 100, as shown in FIGS. 6(e) and 6(f). By appropriately pattering the copper foil, there are prepared the front surface protective member 110 that has the front surface patterns 111, which are spaced from each other, as well as the back surface protective member 120 that has the back surface patterns 121, which are spaced from each other.

Figure 6G:
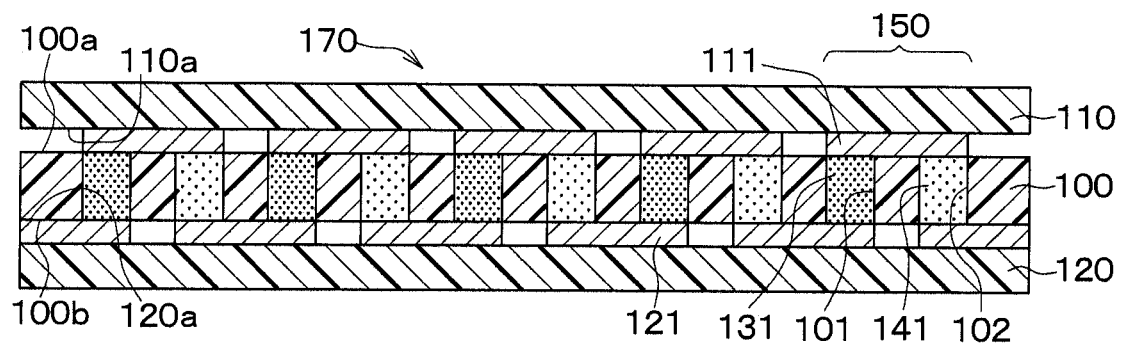

Thereafter, as shown in FIG. 6(g), the back surface protective member 120, the dielectric substrate 100 and the front surface protective member 110 are sequentially stacked one after another to form a laminated body 170.

Figure 6H:
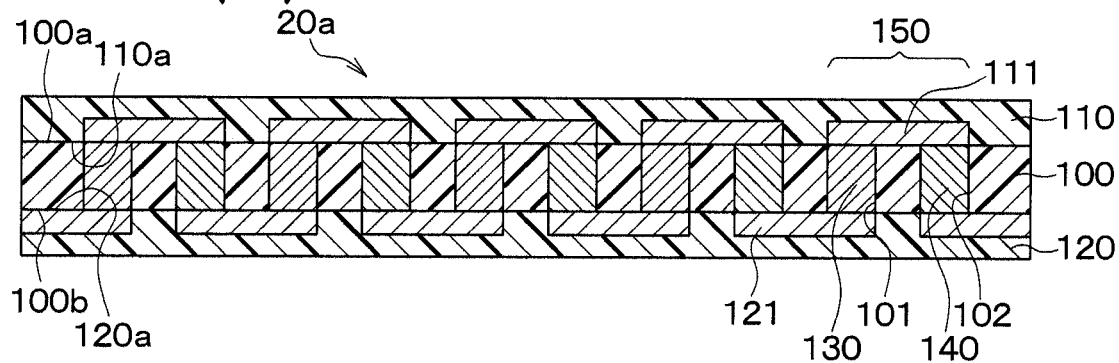

Thereafter, as shown in FIG. 6(h), this laminated body 170 is placed between a pair of press plates. Then, the laminated body 170 is heated and pressed between the press plates from the upper side and the lower side in the stacking direction in a vacuum state, so that the laminated body 170 is formed integrally into a one-piece body. Specifically, the laminated body 170 is formed integrally into the one-piece body through the heating and pressurization, which are executed in such a manner that the primary and secondary conductive pastes 131, 141 are solid-state sintered to form the primary and secondary interlayer connecting members 130, 140, and the primary and secondary interlayer connecting members 130, 140 are joined to the front surface pattern 111 and the back surface pattern 121.

Although not particularly limited to, but a cushioning material, such as a rockwool paper, may be placed between the laminated body 170 and the respective press plates at the time of integrally forming the laminated body 170 into the one-piece body. The first heat flux sensor 20a is manufactured in the above-described manner.

As shown in FIG. 2, a thermal buffer body (thermal storage body) 21a, which is a heat conductor, is in a form of a planar plate that has a predetermined heat capacity (thermal resistance) and is made of, for example, metal (e.g., Cu or Al) or resin. In FIG. 2, although the planar form of the thermal buffer body 21a has the same size as that of the first and second heat flux sensors 20a, 20b, the size of the planar form of the thermal buffer body 21a may be different from that of the first and second heat flux sensors 20a, 20b. In the present embodiment, the thermal buffer body 21a is a one-piece metal plate that is made of metal (e.g., Cu or Al) and extends continuously through an extent that is equal to or larger than a sensing range SE (see FIG. 3), which includes all of the primary interlayer connecting members 130 and the secondary interlayer connecting members 240 formed in the dielectric substrate 100 of the first heat flux sensor 20a, in a plane that is parallel to a plane of the dielectric substrate 100 of the first heat flux sensor 20a and a plane of the dielectric substrate 200 of the second heat flux sensor 20b.

The heat releasing body 22 is in a form of a planar plate that has a predetermined heat capacity (thermal resistance) and is made of, for example, metal (e.g., Cu or Al) or resin. In the present embodiment, the material, the thickness and the like of the heat releasing body 22 are appropriately adjusted, so that the heat capacity of the heat releasing body 22 becomes larger than the heat capacity of the thermal buffer body 21a. The size of the planar form of the heat releasing body 22 is larger than the size of the planar form of the first and second heat flux sensors 20a, 20b and the thermal buffer body 21a. In the present embodiment, the heat releasing body 22 directly releases the heat to the surrounding atmosphere. Alternatively, the heat releasing body 22 may release the heat to another heat sink or coolant.

The state detection sensor 20 is installed to the blade 1 in such a manner that the first heat flux sensor 20a, the thermal buffer body 21a, the second heat flux sensor 20b and the heat releasing body 22 are arranged one after another in this order from the blade 1 side. That is, the thermal buffer body 21a is interposed between the first heat flux sensor 20a and the second heat flux sensor 20b. In the present embodiment, the blade 1 corresponds to the sensing subject of the present disclosure. When the state detection sensor 20 is viewed in an array direction (stacking direction) of the first heat flux sensor 20a, the thermal buffer body 21a, the second heat flux sensor 20b and the heat releasing body 22, projecting portions of the heat releasing body 22, which project from the second heat flux sensor 20b, are fixed to the blade 1 with screws 23, and thereby the state detection sensor 20 is fixed to the blade 1.

Spacers 24, which are made of, for example, resin, are placed between the blade 1 and the heat releasing body 22 to space between the blade 1 and the heat releasing body 22 by a predetermined distance. Each of the screws 23 is received through a corresponding one of the spacers 24 and is securely screwed to the blade 1. Furthermore, although not depicted, an adhesive heat transfer member, such as a heat transfer sheet or heat transfer paste, is interposed between each adjacent two of the first heat flux sensor 20a, the thermal buffer body 21a, the second heat flux sensor 20b and the heat releasing body 22, so that each adjacent two of the first heat flux sensor 20a, the thermal buffer body 21a, the second heat flux sensor 20b and the heat releasing body 22 are bonded together through the adhesive heat transfer member.

Furthermore, in the present embodiment, the first and second heat flux sensors 20a, 20b are arranged such that when the heat flux is generated between the blade 1 and the heat releasing body 22 (the atmosphere), the polarity of the voltage of the first sensor signal, which is outputted from the first heat flux sensor 20a, is opposite from the polarity of the voltage of the second sensor signal, which is outputted from the second heat flux sensor 20b. That is, the first and second heat flux sensors 20a, 20b are arranged such that for example, in a case where the polarity of the voltage of the first sensor signal is positive, the polarity of the voltage of the second sensor signal is negative.

Specifically, as shown in FIG. 2, the first and second heat flux sensors 20a, 20b are arranged such that the front surface protective members 110 of the first and second heat flux sensors 20a, 20b are opposed to each other. Furthermore, an external wiring 302 connects a corresponding one of the back surface patterns 121, which is provided to an output terminal 601a (see FIG. 3) of the first heat flux sensor 20a, to a control unit 30. An external wiring 301 connects a corresponding one of the front surface patterns 111, which is provided to a connection terminal 601b (see FIG. 3) of the first heat flux sensor 20a that is opposite from the output terminal 601a of the first heat flux sensor 20a, to a corresponding one of the front surface patterns 211, which is provided to a connection terminal 701b (see FIG. 3) of the second heat flux sensor 20b. Furthermore, an external wiring 303 connects a corresponding one of the back surface patterns 221, which is provided to an output terminal 701a of the second heat flux sensor 20b that is opposite from the connection terminal 701b of the second heat flux sensor 20b to the control unit 30. Here, although the external wiring 301 extends downward in FIG. 2, the external wiring 301 may extend upward in FIG. 2.

The first and second heat flux sensors 20a, 20b are opposed to each other in the above-described manner, so that in a case where the heat flux passes through the first heat flux sensor 20a from the back surface protective member 120 side to the front surface protective member 110 side, this heat flux passes through the second heat flux sensor 20b from the front surface protective member 210 side to the back surface protective member 220 side. Thereby, the polarity of the first sensor signal outputted from the first heat flux sensor 20a and the polarity of the second sensor signal outputted from the second heat flux sensor 20b become opposite to each other.

In the present embodiment, the first and second heat flux sensors 20a, 20b are arranged such that when a heat flux, which flows from the back surface protective member 120, 220 side to the front surface protective member 110, 210 side, passes through the first or second heat flux sensor 20a, 20b, the first or second heat flux sensor 20a, 20b outputs the sensor signal that has the positive voltage. Thus, in a case where the heat flux, which flows from the blade 1 toward the heat releasing body 22, is generated i.e., in a case where the heat flux, which passes through the first heat flux sensor 20a from the back surface protective member 120 side to the front surface protective member 110 side and passes through the second heat flux sensor 20b from the front surface protective member 210 side to the back surface protective member 220 side, is generated, the sensor signal of the positive voltage is outputted from the first heat flux sensor 20a, and the sensor signal of the negative voltage is outputted from the second heat flux sensor 20b.

The structure of the state detection sensor 20 of the present embodiment has been described.

Next, the control unit 30 will be described. The control unit 30 includes a CPU, various types of memories which form a storage device (storage means), and a peripheral device(s). The control unit 30 is connected to, for example, a speaker (speech means) and/or a display device (display means), which are not shown. The control unit 30 is connected to the first and second heat flux sensors 20a, 20b in the above-described manner. When the first and second sensor signals are inputted from the first and second heat flux sensors 20a, 20b to the control unit 30, the control unit 30 determines whether abnormal heating is generated at the blade 1 based on the first and second sensor signals and a threshold value stored in the storage means. Specifically, the control unit 30 determines whether the abnormal heating is generated at the blade 1 by comparing a sum of the first and second sensor signals with the threshold value. When the control unit 30 determines that the abnormal heating is generated at the blade 1, the control unit 30 notifies the generation of the abnormal heating at the blade 1 to a worker through the display device (display means) and/or the speaker (speech means). The abnormal heating is generated at the blade 1 in a case of, for example, occurrence of chipping of the blade 1.

The structure of the abnormality determining device S2 of the present embodiment has been described. Next, an abnormality determining method through use of the abnormality determining device S2 will be described. First of all, the heat flux, which passes through the first and second heat flux sensors 20a, 20b, and the first and second sensor signals, which are outputted from the first and second heat flux sensors 20a, 20b, will be described.

Although the heat releasing body 22 is exposed to the surrounding atmosphere, the heat releasing body 22 is formed to have the predetermined heat capacity, as discussed above. Thus, in a case of occurrence of a change in the temperature of the surrounding atmosphere, the heat releasing body 22 accumulates heat and release the heat in response to the change in the temperature of the surrounding atmosphere. Therefore, influence of the surrounding atmosphere to the first and second heat flux sensors 20a, 20b, which is located on the blade 1 side of the heat releasing body 22, is limited.

Figure 7A:
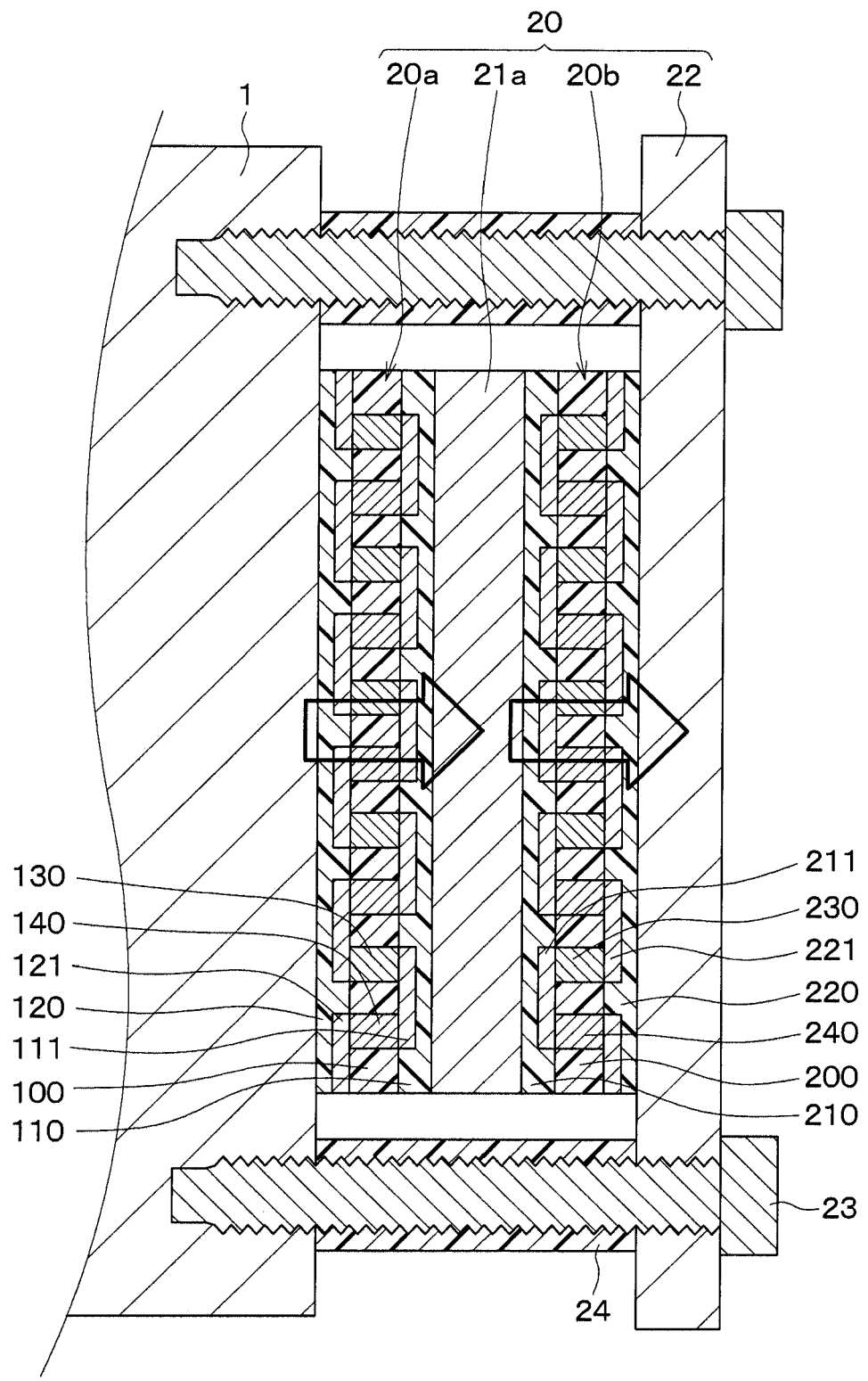
FIG. 7A is a diagram indicating a heat flux that passes through the first and second heat flux sensors in a case where a blade is normal.

In a case where the abnormal heating is not generated in the blade 1, or after elapse of a predetermined time period from the time of generating the abnormal heating at the blade 1, the thermal buffer body 21a is in a state where a predetermined amount of heat is accumulated in the thermal buffer body 21a. Thus, as indicated by arrows in FIG. 7A, the heat flux, which passes through the first heat flux sensor 20a, is generally equal to the heat flux, which passes through the second heat flux sensor 20b. Therefore, the voltage of the first sensor signal outputted from the first heat flux sensor 20a and the voltage of the second sensor signal outputted from the second heat flux sensor 20b have generally the identical absolute value but opposite polarities, respectively. Therefore, in this state, a sum of the voltage of the first sensor signal and the voltage of the second sensor signal is generally 0 (zero).

Figure 7B:
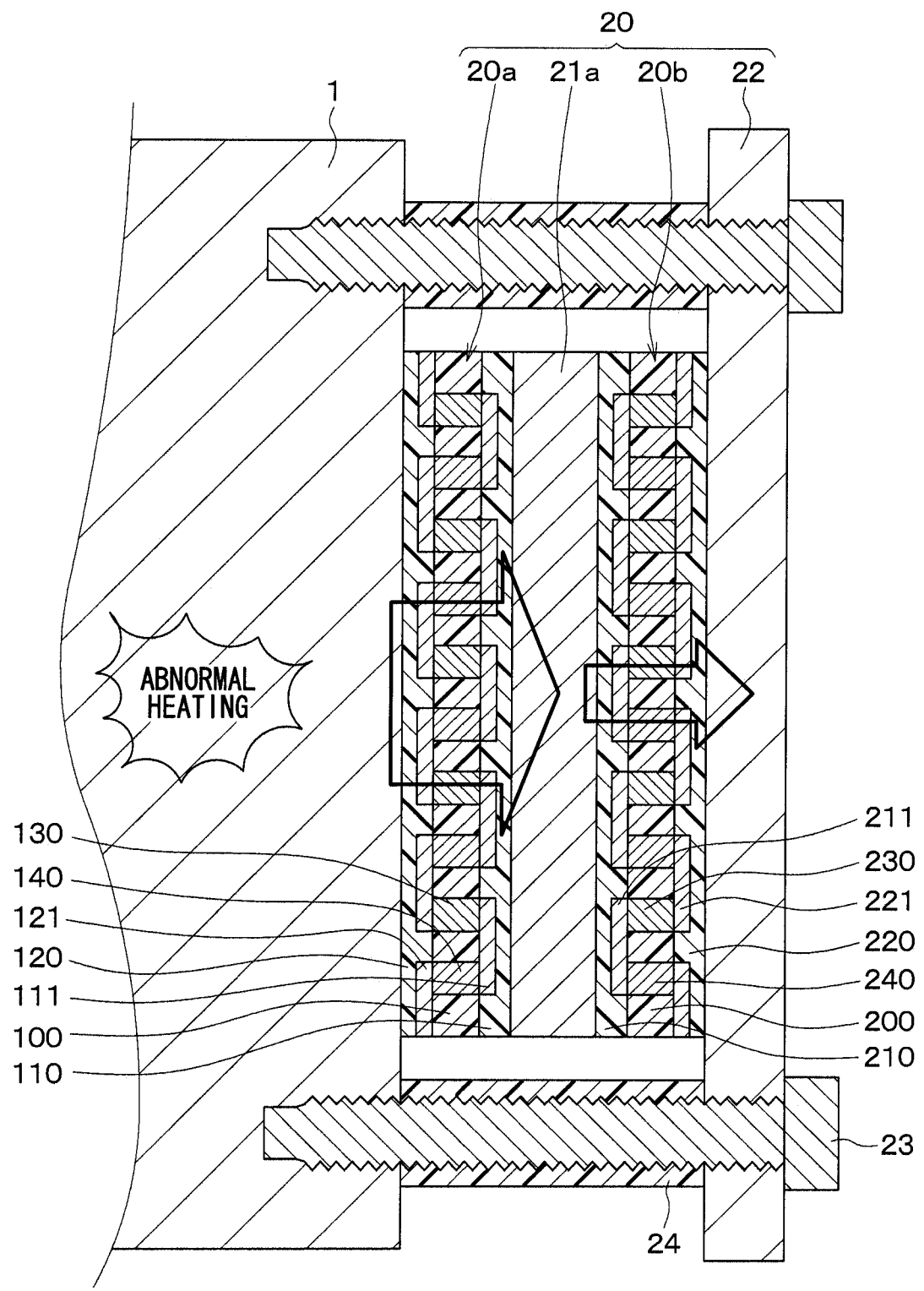
FIG. 7B is a diagram indicating a heat flux that passes through the first and second heat flux sensors in a case where an abnormal heating occurs at the blade.

In contrast, in the case where the abnormal heating is generated in the blade 1, although the heat flux, which passes through the first heat flux sensor 20a, momentarily becomes large, the heat of the abnormal heating is accumulated in the thermal buffer body 21a. Thereby, the heat flux, which passes through the second heat flux sensor 20b, does not substantially change, as indicated by arrows in FIG. 7B. That is, the heat flux, which passes through the first heat flux sensor 20a, differs from the heat flux, which passes through the second heat flux sensor 20b. Thereby, in the case where the abnormal heating is generated at the blade 1, the voltage of the first sensor signal outputted from the first heat flux sensor 20a and the voltage of the second sensor signal outputted from the second heat flux sensor 20b have different absolute values and opposite polarities. That is, in the case where the abnormal heating is generated at the blade 1, the first and second sensor signals, which correspond to the abnormal heating, are outputted from the first and second heat flux sensors 20a, 20b regardless of the state of the surrounding atmosphere.

Figure 8:
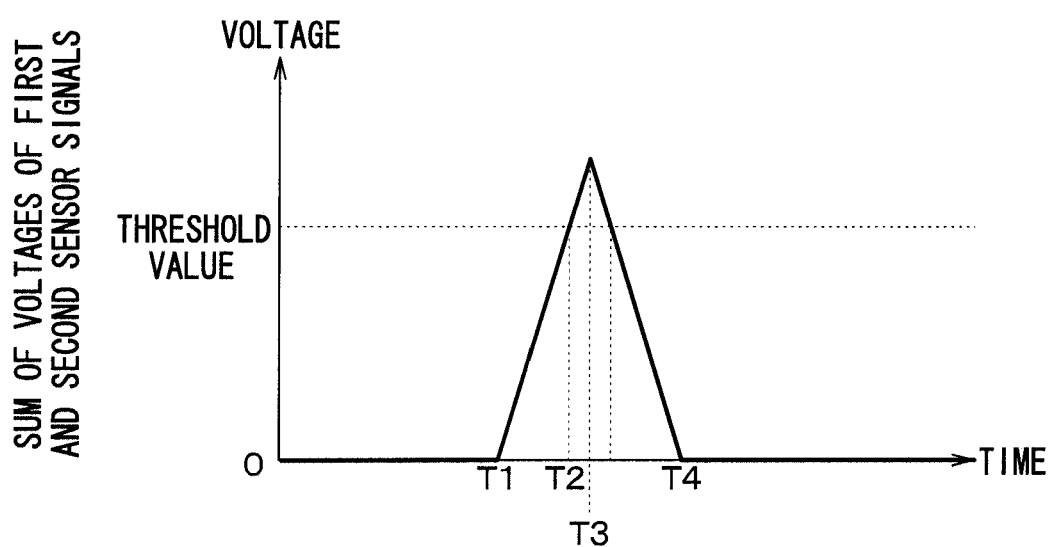
FIG. 8 is a diagram indicating a relationship between a sum of a voltage of a first sensor signal and a voltage of a second sensor signal and time.

The relationship between the heat flux, which passes through the first and second heat flux sensors 20a, 20b, and the first and second sensor signals, which are outputted from the first and second heat flux sensors 20a, 20b, has been described. Next, the abnormality determination at the control unit 30 will be described with reference to FIG. 8. FIG. 8 is a diagram indicating a relationship between the sum of the voltage of the first sensor signal and the voltage of the second sensor signal and the time in a case where the abnormal heating is generated at the blade 1 at a time point T1.

The control unit 30 determines whether the abnormal heating is generated at the blade 1 based on the sum of the voltage of the first sensor signal and the voltage of the second sensor signal and also based on the threshold value. In the present embodiment, the control unit 30 determines whether the sum of the voltage of the first sensor signal and the voltage of the second sensor signal is larger than the threshold value. In a case where the control unit 30 determines that the sum of the voltage of the first sensor signal and the voltage of the second sensor signal is larger than the threshold value, the control unit 30 determines that the abnormal heating is generated at the blade 1 (the cutting device S1).

Specifically, before the time point T1, at which the abnormal heating is generated at the blade 1, the heat flux, which passes through the first heat flux sensor 20a, and the heat flux, which passes through the second heat flux sensor 20b, are equal to each other (see FIG. 7A), and the sum of the voltage of the first sensor signal and the voltage of the second sensor signal is smaller than the threshold value. Thus, the control unit 30 determines that the blade 1 is normal.

In contrast, when the abnormal heating is generated at the time point T1, the heat flux, which passes through the first heat flux sensor 20a, and the heat flux, which passes through the second heat flux sensor 20b, become different from each other (see FIG. 7B), and the sum of the voltage of the first sensor signal and the voltage of the second sensor signal becomes larger than the threshold value in a time period from the time point T2 to the time point T4. Thus, the control unit 30 determines that the abnormal heating is generated at the blade 1 and notifies the generation of the abnormal heating at the blade 1 to the worker through, for example, the speech means and/or the display means.

After the time point T3, as discussed above, the heat of the abnormal heating is accumulated in the thermal buffer body 21a. Therefore, the difference between the heat flux, which passes through the first heat flux sensor 20a, and the heat flux, which passes through the second heat flux sensor 20b, is progressively reduced. Therefore, after the time point T3, the sum of the voltage of the first sensor signal and the voltage of the second sensor signal approaches 0 (zero).

As discussed above, the state detection sensor 20 of the present embodiment includes: the first and second heat flux sensors 20a, 20b, which respectively output the first and second sensor signals that correspond to the heat flux passing through the first and second heat flux sensors 20a, 20b in the thickness direction; the thermal buffer body 21a, which has the predetermined heat capacity; and the heat releasing body 22, which has the predetermined heat capacity. Furthermore, the first heat flux sensor 20a, the thermal buffer body 21a, the second heat flux sensor 20b and the heat releasing body 22 are arranged in this order from the blade 1 side. Therefore, since the heat releasing body 22 executes the releasing and accumulating of the heat, it is possible to limit the influence of the surrounding atmosphere on the first and second heat flux sensors 20a, 20b. Furthermore, due to the placement of the thermal buffer body 21a between the first heat flux sensor 20a and the second heat flux sensor 20b, in the case where the abnormal heating is not generated at the blade 1, the heat flux, which passes through the first heat flux sensor 20a, and the heat flux, which passes through the second heat flux sensor 20b, become equal to each other (see FIG. 7A). Furthermore, in the case where the abnormal heating is generated at the blade 1, the heat flux, which passes through the first heat flux sensor 20a, and the heat flux, which passes through the second heat flux sensor 20b, momentarily become different from each other (see FIG. 7B). Thus, it is possible to limit deterioration of the sensing accuracy for sensing the state of the blade 1 regardless of the state of the surrounding atmosphere.

When the abnormality determining device S2 is constructed through use of the state detection sensor 20, the state detection sensor 20 can output the accurate first and second sensor signals regardless of the state of the surrounding atmosphere. Therefore, the determining accuracy for the abnormal heating at the blade 1 can be improved.

Furthermore, according to the present embodiment, the first heat flux sensor 20a and the second heat flux sensor 20b are arranged such that the polarity of the voltage of the first sensor signal outputted from the first heat flux sensor 20a and the polarity of the voltage of the second sensor signal outputted from the second heat flux sensor 20b are opposite to each other. Therefore, the computing process at the control unit 30 can be simplified.

In the present embodiment, the first and second heat flux sensors 20a, 20b are formed such that the primary and secondary via holes 101, 102 are formed in the dielectric substrate 100 made of the thermoplastic resin, and the primary and secondary interlayer connecting members 130, 140 are placed in the primary and secondary via holes 101, 102. Therefore, by appropriately changing, for example, the numbers, the diameters, and the intervals of the primary and secondary via holes 101, 102, it is possible to increase the density of the primary and secondary interlayer connecting members 130, 140. Thereby, the electromotive voltage can be increased to improve the sensitivity of the first and second heat flux sensors 20a, 20b.

Furthermore, the first and second heat flux sensors 20a, 20b use the intermetallic compounds (the Bi—Sb—Te alloy, the Bi—Te alloy) as the primary and secondary interlayer connecting members 130, 140, and these intermetallic compounds (the Bi—Sb—Te alloy, the Bi—Te alloy) are solid-state sintered such that the crystalline structure before the execution of the solid-state sintering is maintained upon the execution of the solid-state sintering. That is, the metals of the primary and secondary interlayer connecting members 130, 140, 230, 240 are the sintered metals, which are sintered in the state where the metal atoms thereof maintain the crystalline structure thereof. Thus, in comparison to a case where the metals of the primary and secondary interlayer connecting members 130, 140, 230, 240 are sintered metals, which are liquid-state sintered, the electromotive voltage can be increased, and thereby the sensitivity of the first and second heat flux sensors 20a, 20b can be increased.

Furthermore, in the first and second heat flux sensors 20a, 20b of the present embodiment, the dielectric substrates 100, 200, the front surface protective members 110, 210, and the back surface protective member 120, 220 are made of the thermoplastic resin and have the flexibility. Therefore, the shapes of the first and second heat flux sensors 20a, 20b can be appropriately changed according to the shape of the place where the first and second heat flux sensors 20a, 20b are installed.

In the above discussion, the abnormality is determined by determining whether the sum of the voltage of the first sensor signal and the voltage of the second sensor signal is larger than the threshold value. Alternatively, the abnormality may be determined based on the time period (the time period from the time point T2 to the time point T4 in FIG. 8), in which the sum of the voltage of the first sensor signal and the voltage of the second sensor signal is larger than the threshold value. In this way, it is possible to eliminate the case where the sum of the voltage of the first sensor signal and the voltage of the second sensor signal is momentarily increased above the threshold value due to, for example, a noise. Thus, the determining accuracy can be further improved.

Second Embodiment

A second embodiment of the present disclosure will be described. In the present embodiment, a heat receiving body is placed on an opposite side of the first heat flux sensor 20a, which is opposite from the thermal buffer body 21a. The rest of the present embodiment is the same as that of the first embodiment and thereby will not be described for the sake of simplicity.

Figure 9:
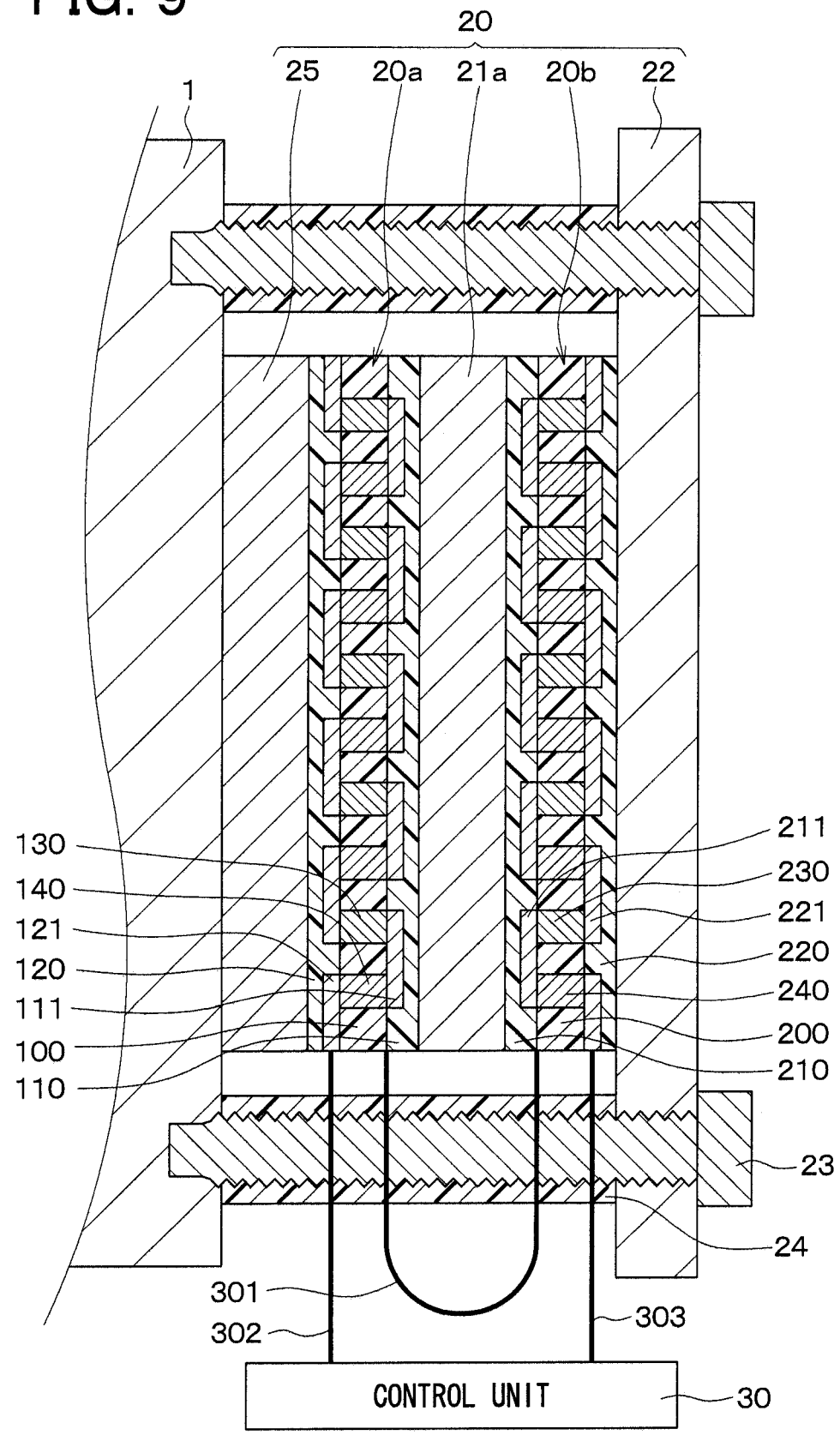
FIG. 9 is a cross sectional view showing a structure of a state detection sensor of a second embodiment of the present disclosure.

In the present embodiment, as shown in FIG. 9, the state detection sensor 20 includes the heat receiving body 25, which is placed on the opposite side of the first heat flux sensor 20a, which is opposite from the thermal buffer body 21a. That is, the state detection sensor 20 includes the heat receiving body 25, which is placed between the blade 1 and the first heat flux sensor 20a. Similar to the thermal buffer body 21a and the heat releasing body 22, the heat receiving body 25 is in a form of a planar plate that has a predetermined heat capacity (thermal resistance) and is made of, for example, metal (e.g., Cu or Al) or resin. The material and the thickness of the heat receiving body 25 of the present embodiment are adjusted such that the heat capacity of the heat receiving body 25 is smaller than the heat capacity of the thermal buffer body 21a and the heat capacity of the heat releasing body 22.

In the state detection sensor 20 constructed in the above-described manner, it is possible to limit occurrence of that the first and second heat flux sensors 20a, 20b are influenced by a small heat flux change, such as a noise, which is generated at the blade 1 through the releasing and accumulating of the heat at the heat receiving body 25. Therefore, the state sensing accuracy can be further improved.

Furthermore, in the case where the small heat flux change, such as the noise, is generated at the blade 1, normally, this heat flux change is generated only for a very short period of time. Thus, like in the case of the present embodiment, when the heat capacity of the heat receiving body 25 is set to be smaller than the heat capacity of the thermal buffer body 21a and the heat capacity of the heat releasing body 22, the influence of the short-time noise on the first and second heat flux sensors 20a, 20b can be effectively limited.

Third Embodiment

A third embodiment of the present disclosure will be described. In the present embodiment, additional heat flux sensors and additional thermal buffer bodies are provided to the structure of the first embodiment. The rest of the present embodiment is the same as that of the first embodiment and thereby will not be described for the sake of simplicity.

Figure 10:
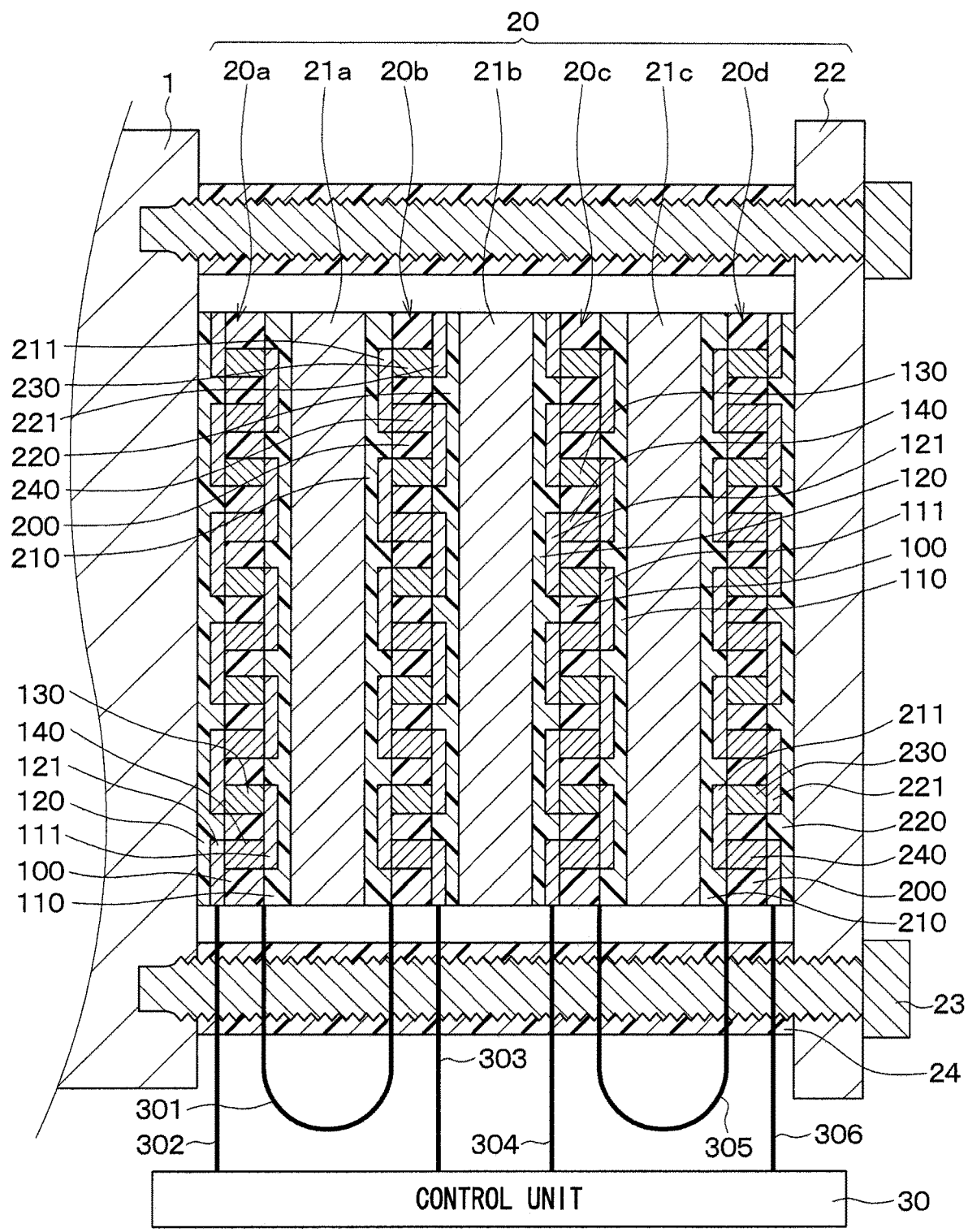
FIG. 10 is a cross sectional view showing a structure of a state detection sensor of a third embodiment of the present disclosure.

In the present embodiment, as shown in FIG. 10, the state detection sensor 20 includes third and fourth heat flux sensors 20c, 20d and thermal buffer bodies 21b, 21c in addition to the first and second heat flux sensors 20a, 20b and the thermal buffer body 21a. In the state detection sensor 20, the first heat flux sensor 20a, the thermal buffer body 21a, the second heat flux sensor 20b, the thermal buffer body 21b, the third heat flux sensor 20c, the thermal buffer body 21c, the fourth heat flux sensor 20d and the heat releasing body 22 are arranged one after another in this order from the blade 1 side.

The constructions of the third and fourth heat flux sensors 20c, 20d are the same as the constructions of the first and second heat flux sensors 20a, 20b. The third and fourth heat flux sensors 20c, 20d respectively output third and fourth sensor signals, which correspond to the heat flux that passes the third and fourth heat flux sensors 20c, 20d in the thickness direction thereof. In FIG. 10, the references signs of the dielectric substrate 100, the front surface protective member 110, the front surface patterns 111, the back surface protective member 120, the back surface patterns 121 and the primary and secondary interlayer connecting members 130, 140 of the third heat flux sensor 20c are the same as those of the first heat flux sensor 20a, and the reference signs of the dielectric substrate 200, the front surface protective member 210, the front surface patterns 211, the back surface protective member 220, the back surface patterns 221 and the first and second interlayer connecting members 230, 240 are the same as those of the second heat flux sensor 20b.

Similar to the first and second heat flux sensors 20a, 20b, the third and fourth heat flux sensors 20c, 20d are arranged such that the front surface protective member 110 of the third heat flux sensor 20c and the front surface protective member 210 of the fourth heat flux sensor 20d are opposed to each other. Furthermore, an external wiring 304 connects a corresponding one of the back surface patterns 121, which is provided to the output terminal 601a (see FIG. 3) of the third heat flux sensor 20c, to the control unit 30. An external wiring 305 connects a corresponding one of the front surface patterns 111, which is provided to the connection terminal 601b (see FIG. 3) of the third heat flux sensor 20c that is opposite from the output terminal 601a of the third heat flux sensor 20c, to a corresponding one of the front surface patterns 211, which is provided to the connection terminal 701b (see FIG. 3) of the fourth heat flux sensor 20d. Furthermore, an external wiring 306 connects a corresponding one of the back surface patterns 221, which is provided to the output terminal 701a of the fourth heat flux sensor 20d that is opposite from the connection terminal 701b of the fourth heat flux sensor 20d, to the control unit 30. The third and fourth heat flux sensors 20c, 20d are opposed to each other in the above-described manner. Thus, in a case where the heat flux passes through the third heat flux sensor 20c from the back surface protective member 120 side to the front surface protective member 110 side, this heat flux passes through the fourth heat flux sensor 20d from the front surface protective member 210 side to the back surface protective member 220 side. Thereby, the polarity of the third sensor signal outputted from the third heat flux sensor 20c and the polarity of the fourth sensor signal outputted from the fourth heat flux sensor 20d become opposite to each other.

Similar to the thermal buffer body 21a, the thermal buffer bodies 21b, 21c are in a form of a planar plate that has a predetermined heat capacity (thermal resistance) and is made of, for example, metal (e.g., Cu or Al) or resin. In the present embodiment, the thermal buffer bodies 21a-21c are constructed to have the identical heat capacity. Furthermore, the thermal buffer bodies 21a-21c are respectively provided as a first thermal buffer body (first thermal storage body), a second thermal buffer body (second thermal storage body), and a third thermal buffer body (third thermal storage body).

The control unit 30 receives the third and fourth sensor signals in addition to the first and second sensor signals. When the control unit 30 receives the first to fourth sensor signals, the control unit 30 adds up a sum of the voltages of the first and second sensor signals and a sum of the voltages of the third and fourth sensor signals together. Then, the control unit 30 compares this added value with a corresponding threshold value to determine whether abnormal heating is generated at the blade 1.

Next, the first to fourth sensor signals, which are outputted from the first to fourth heat flux sensors 20a-20d, will be described.

Similar to the first embodiment, in the state detection sensor 20, which is constructed in the above-described manner, in the case where the abnormal heating is not generated in the blade 1, or after elapse of the predetermined time period from the time of generating the abnormal heating at the blade 1, the respective thermal buffer bodies 21a-21c are in a state where a predetermined amount of heat is accumulated in the thermal buffer body 21a-21c. Thus, the heat fluxes, which respectively pass through the first to fourth heat flux sensors 20a-20d, become generally equal to each other. Therefore, the voltage of the first sensor signal and the voltage of the second sensor signal have generally the identical absolute value but opposite polarities, respectively, and the voltage of the third sensor signal and the voltage of the fourth sensor signal have generally the identical absolute value but opposite polarities, respectively.

In the case where the abnormal heating is generated at the blade 1, the heat of the abnormal heating is sequentially accumulated in the thermal buffer bodies 21a-21c. Thus, the heat flux, which passes through the first heat flux sensor 20a, is increased first, and then the heat flux, which passes through the second heat flux sensor 20b, the heat flux, which passes through the third heat flux sensor 20c, and the heat flux, which passes through the fourth heat flux sensor 20d, are sequentially increased. Then, after elapse of the predetermined time period, the heat fluxes, which respectively pass through the first to fourth heat flux sensors 20a-20d, become generally equal to each other. Thus, in the case where the abnormal heating is generated at the blade 1, first of all, the voltage of the first sensor signal and the voltage of the second sensor signal have different polarities and different absolute values. Then, the voltage of the third sensor signal and the voltage of the fourth sensor signal have different polarities and different absolute values.

Figure 11:
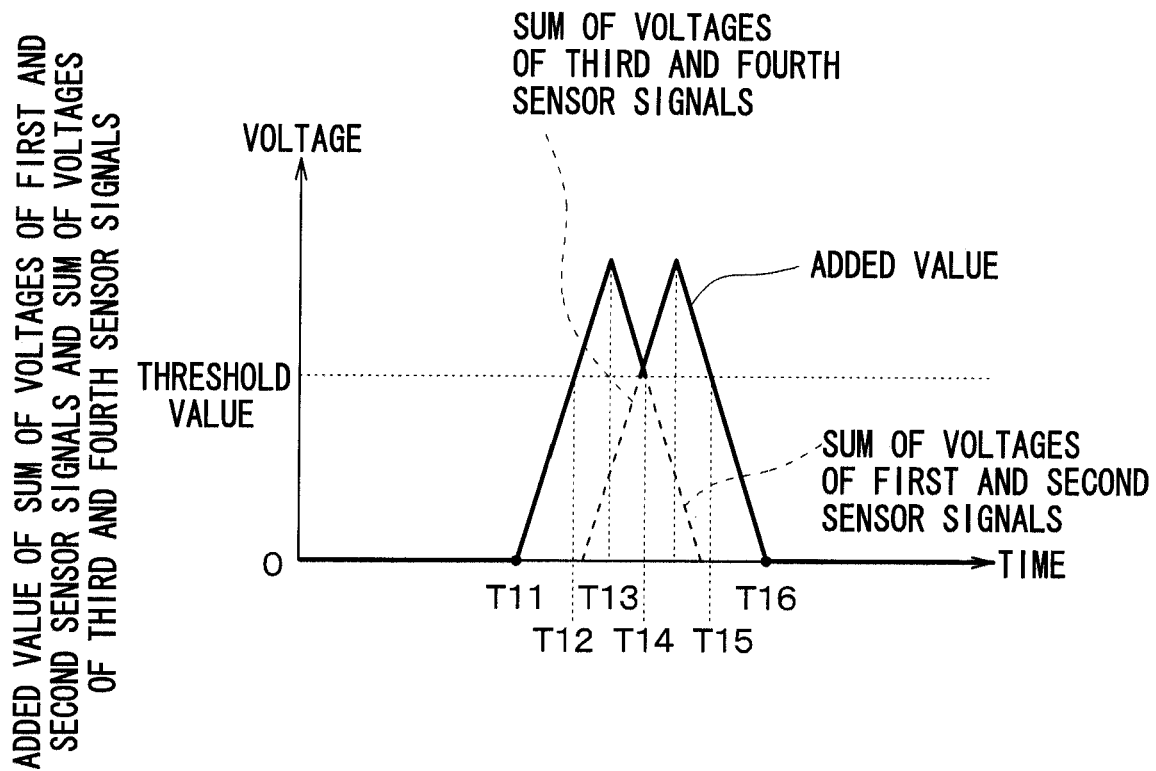
FIG. 11 is a diagram indicating a relationship between a total value of a sum of voltages of first and second sensor signals and a sum of voltages of third and fourth sensor signals and time.

Next, the abnormality determination at the control unit 30 will be described with reference to FIG. 11. FIG. 11 is a diagram that shows a relationship of the total value of the sum of the voltages of the first and second sensor signals and the sum of the voltages of the third and fourth sensor signals with time in the case where the abnormal heating is generated at the blade 1 at the time point T11.

As discussed above, the control unit 30 determines whether the abnormal heating is generated at the blade 1 based on the total value of the sum of the voltages of the first and second sensor signals and the sum of the voltages of the third and fourth sensor signals and also based on the threshold value.

Specifically, the heat fluxes, which pass through the first to fourth heat flux sensors 20*a*-20*d*, are equal to each other before the time point T11, at which the abnormal heating is generated at the blade 1, so that the total value of the sum of the voltages of the first and second sensor signals and the sum of the voltages of the third and fourth sensor signals is lower than the threshold value. Thus, the control unit 30 determines that the blade 1 is normal.

In contrast, when the abnormal heating is generated at the time point T11, the heat flux, which passes through the first heat flux sensor 20*a*, and the heat flux, which passes through the second heat flux sensor 20*b*, are different from each other. Here, it should be noted that the heat flux, which passes through the third heat flux sensor 20*c*, and the heat flux, which passes through the fourth heat flux sensor 20*d*, are still equal to each other at the time immediately after the generation of abnormal heating at the time point T11. Since the heat flux, which passes through the first heat flux sensor 20*a*, and the heat flux, which passes through the second heat flux sensor 20*b*, are different from each other, the total value, which is obtained through the addition, becomes larger than the threshold value at the time point T12.

Thereafter, once the heat of the abnormal heating is accumulated in the thermal buffer body 21*a*, the heat of the abnormal heating is also sequentially accumulated in the thermal buffer bodies 21*b*, 21*c*. That is, after the heat flux, which passes through the first heat flux sensor 20*a*, is increased, the heat flux, which passes through the second heat flux sensor 20*b*, the heat flux, which passes through the third heat flux sensor 20*c*, and the heat flux, which passes through the fourth heat flux sensor 20*d*, are sequentially increased. Specifically, a difference between the heat flux, which passes through the first heat flux sensor 20*a*, and the heat flux, which passes through the second heat flux sensor 20*b*, is reduced from the time point T13. However, since the heat flux, which passes through the third heat flux sensor 20*c*, and the heat flux, which passes through the fourth heat flux sensor 20*d*, are different from each other, the total value is increased once again from the time point T14. A difference between the heat flux, which passes through the third heat flux sensor 20*c*, and the heat flux, which passes through the fourth heat flux sensor 20*d*, is also reduced from the tie point T15. Then, the total value becomes smaller than the threshold value at the tie point T16. That is, in the present embodiment, the total value becomes larger than the threshold value in the period that is from the time point T12 to the time point T16.

As discussed above, the state detection sensor 20 may be constructed to have the first to fourth heat flux sensors 20*a*-20*d* and the thermal buffer bodies 21*a*-21*c*. In the case where the abnormality determination is made with the state detection sensor 20, the time period (the time point T12 to the time point T15), during which the total value is larger than the threshold value, is lengthened. Thus, for example, in a case where the abnormality determination is made based on the time period, during which the total value is larger than the threshold value, it is possible to eliminate an influence of a noise that is instantaneously increased above the threshold value. Therefore, the determining accuracy can be further improved.

Fourth Embodiment

A fourth embodiment of the present disclosure will be described. In the present embodiment, a plurality of sets of the first and second heat flux sensors 20*a*, 20*b* is provided to the structure of the first embodiment. The rest of the present embodiment is the same as that of the first embodiment and thereby will not be described for the sake of simplicity.

Figure 12:
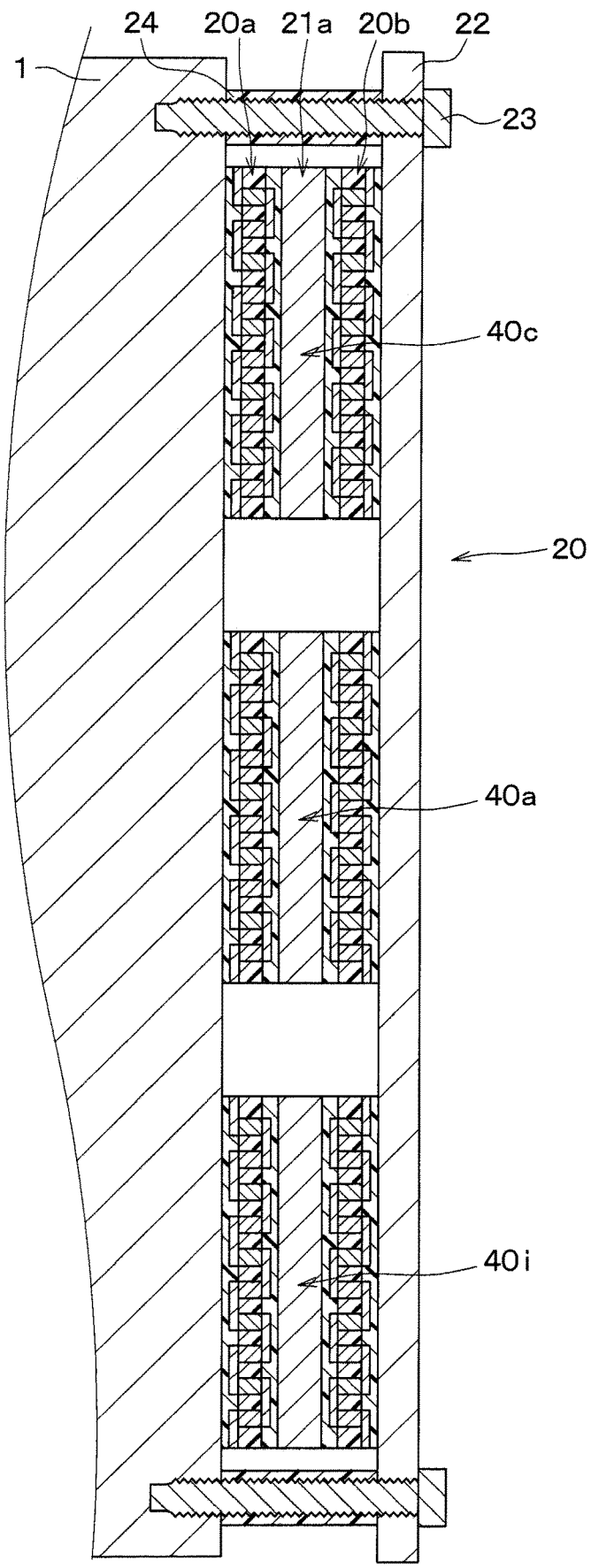
FIG. 12 is a cross sectional view showing a structure of a state detection sensor of a fourth embodiment of the present disclosure.
Figure 13:
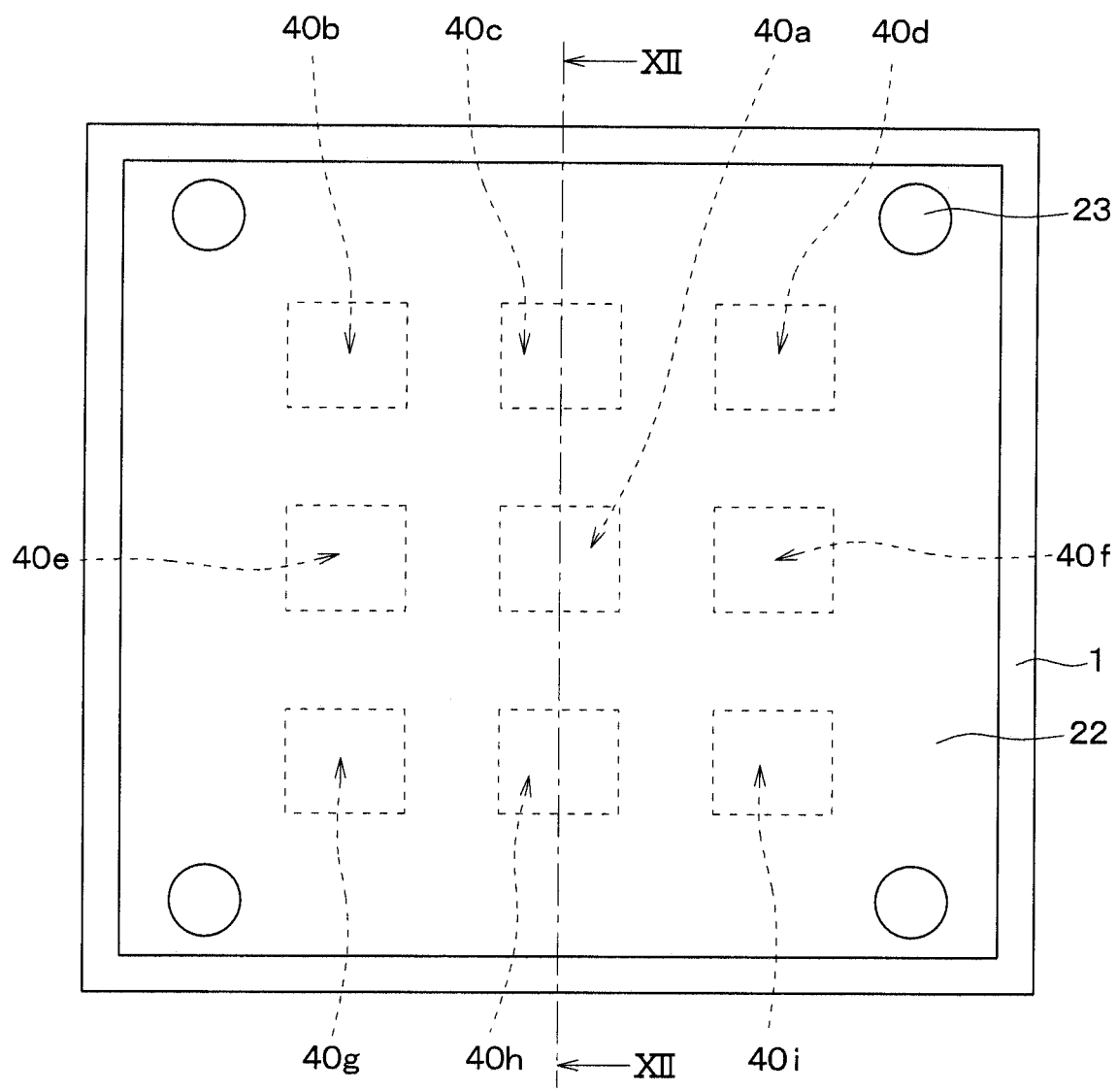
FIG. 13 is a plan view of the state detection sensor of FIG. 12.

In the present embodiment, as shown in FIGS. 12 and 13, the state detection sensor 20 has first to ninth arrangements 40*a*-40*i*, each of which includes the first heat flux sensor 20*a*, the thermal buffer body 21*a*, and the second heat flux sensor 20*b*. Specifically, the first to ninth arrangements 40*a*-40*i* are arranged such that the first arrangement 40*a* is centered, and the second to ninth arrangements 40*b*-40*i* are evenly arranged around the first arrangement 40*a*. One piece of heat releasing body 22 is placed on the second heat flux sensor 20*b* having the first to ninth arrangements 40*a*-40*i*. That is, in the present embodiment, the heat releasing body 22 is common to the first to ninth arrangements 40*a*-40*i*.

Furthermore, although not depicted in the drawings, the control unit 30 receives the first and second sensor signals from the first and second heat flux sensors 20*a*, 20*b* of each of the first to ninth arrangements 40*a*-40*i*. Every sum of the voltage of the first sensor signal and the voltage of the second sensor signal at each of the first to ninth arrangements 40*a*-40*i* is added together to obtain a total value, and this total value is compared with a threshold value to determine whether the abnormal heating is generated at the blade 1.

In this state detection sensor 20, the first and second sensor signals, which are similar to those of the first embodiment, are outputted from the first and second heat flux sensors 20*a*, 20*b* at each of the first to ninth arrangements 40*a*-40*i*.

Next, the abnormality determination at the control unit 30 will be described. The control unit 30 adds every sum of the voltage of the first sensor signal and the voltage of the second sensor signal generated at each of the first to ninth arrangements 40*a*-40*i* to obtain the total value, and then the control unit 30 compares this total value with the threshold value to determine whether the abnormal heating is generated at the blade 1.

Specifically, in the case where the abnormal heating is not generated at the blade 1, at each of the first to ninth arrangements 40*a*-40*i*, the voltage of the first sensor signal and the voltage of the second sensor signal have generally the identical absolute value but opposite polarities, respectively. Therefore, the total value of the sums of the voltages of the first sensor signals and the voltages of the second sensor signals generated at the first to ninth arrangements 40*a*-40*i* becomes smaller than the threshold value. Thus, the control unit 30 determines that the blade 1 is normal.

When the abnormal heating is generated at the blade 1, the heat flux, which passes through the first heat flux sensor 20*a*, and the heat flux, which passes through the second heat flux sensor 20*b*, are different from each other at each of the first to ninth arrangements 40*a*-40*i*. Thus, the total value of the sums of the voltages of the first sensor signals and the voltages of the second sensor signals generated at the first to ninth arrangements 40a-40i becomes larger than the threshold value. Therefore, the control unit 30 determines that the abnormal heating is generated at the blade 1.

As discussed above, the state detection sensor 20 may be constructed to have the first to ninth arrangements 40a-40i. In the case where the abnormality determination is made with this state detection sensor 20, the value (the total value), which is compared with the threshold value, becomes large. Therefore, the threshold value itself can be increased. Thus, for example, even when the voltages of the first and second sensor signals are changed at the first arrangement 40a due to presence of the noise, a change as a whole is small. Thus, the determining accuracy can be further improved.

In the above discussion, there is described the case where the heat releasing body 22 is common to the first to ninth arrangements 40a-40i. Alternatively, the first to ninth arrangements 40a-40i may have the heat releasing bodies 22, respectively. Furthermore, the number of the arrangements 40a-40i may be appropriately changed.

Fifth Embodiment

A fifth embodiment of the present disclosure will be described. In the present embodiment, the structure of the state detection sensor 20 is changed from that of the first embodiment. The rest of the present embodiment is the same as that of the first embodiment and thereby will not be described for the sake of simplicity.

Figure 14:
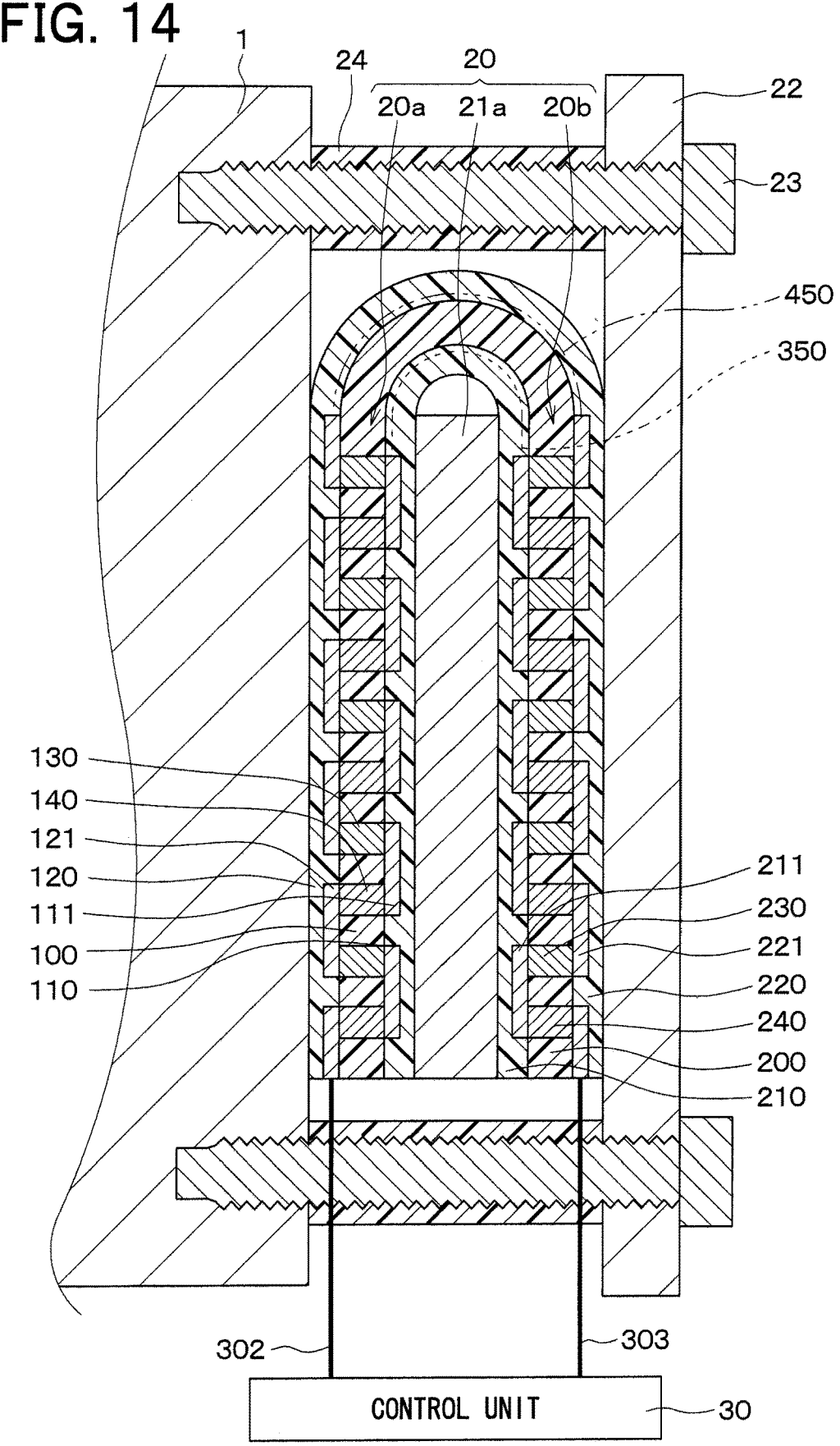
FIG. 14 is a cross sectional view showing a structure of a state detection sensor of a fifth embodiment of the present disclosure.

In the present embodiment, as shown in FIG. 14, the first and second heat flux sensors 20a, 20b are formed integrally into a one-piece body. That is, a single heat flux sensor is bent to clamp the thermal buffer body 21a. In a cross section that is different from the cross section shown in FIG. 14, the first and second heat flux sensors 20a, 20b are connected with each other such that the front surface pattern 111, which is formed at the connection terminal 601b (see FIG. 3) of the first heat flux sensor 20a, and the front surface pattern 211, which is formed at the connection terminal 701b (see FIG. 3) of the second heat flux sensor 20b, are directly and continuously connected with each other through a front surface pattern 350, which is formed at the front surface protective members 110, 210, without using the external wiring 301.

As discussed above, in the present embodiment, the first and second heat flux sensors 20a, 20b are formed by the single heat flux sensor, and thereby the external wiring 301, which connects between the first heat flux sensor 20a and the second heat flux sensor 20b, can be eliminated. Thus, the number of components can be reduced.

Here, it is only required to change the form of the pattern at the time of executing the patterning at the step of FIG. 6(e) to produce the front surface pattern (connection pattern) 350, which connects between the first and second heat flux sensors 20a, 20b. Therefore, the manufacturing process will not be complicated. Furthermore, in the first and second heat flux sensors 20a, 20b, the dielectric substrates 100, 200, the front surface protective members 110, 210, and the back surface protective members 120, 220 are respectively made of the resin, so that the first and second heat flux sensors 20a, 20b can be easily bent.

Sixth Embodiment

A sixth embodiment of the present disclosure will be described. In the present embodiment, abnormality determination of a milling device is executed. The rest of the present embodiment is the same as that of the first embodiment and thereby will not be described for the sake of simplicity.

Figure 15:
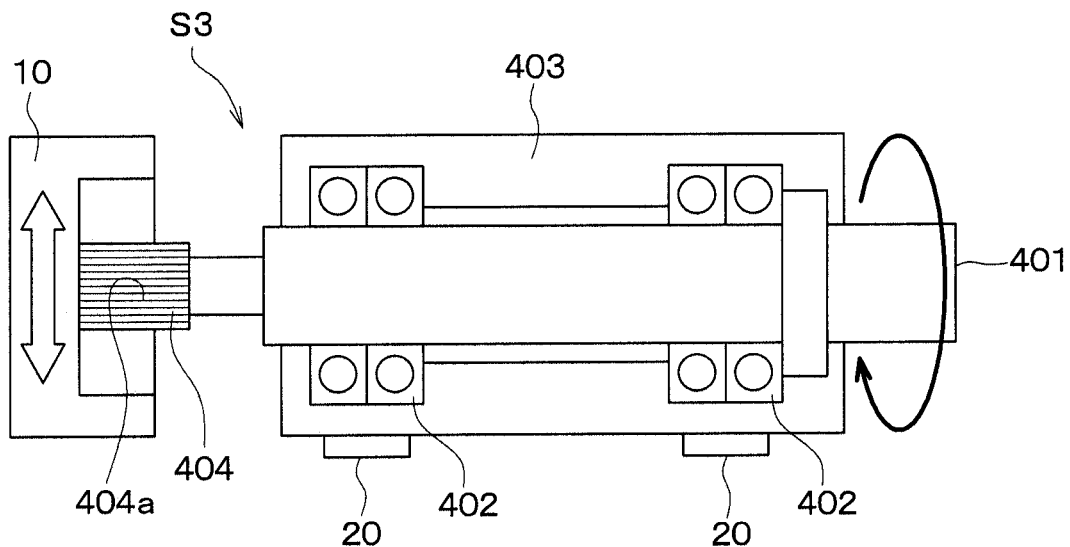
FIG. 15 is a schematic diagram showing an abnormality determining device of a sixth embodiment of the present disclosure applied to a milling device.

In the present embodiment, there will be described an example, in which the abnormality determining device S2 is used to determine the abnormal heating of the milling device. As shown in FIG. 15, the milling device S3 includes a spindle 401, bearings 402, a support member 403, and an end mill 404. The spindle 401 rotates about an axis. The bearings 402 rotatably support the spindle 401. The support member 403 supports the spindle 401 and the bearings 402. The end mill 404 is installed to one end portion of the spindle 401 in the axial direction and includes blades 404a at an outer peripheral surface of the end mill 404. In this milling device S3, the end mill 404 is rotated synchronously with the spindle 401. The processing subject member 10 is cut with the blades 404a of the end mill 404 when the blades 404a are rotated and are urged against the processing subject member 10.

The state detection sensors 20 are placed adjacent to the bearings 402, respectively, at the support member 403 in the milling device S3. In the present embodiment, the number of the bearings 402 is two, and each of the state detection sensors 20 is placed adjacent to the corresponding one of the bearings 402.

In the present embodiment, the support member 403 corresponds to the sensing subject of the present disclosure. Furthermore, in the state detection sensor 20, although not particularly depicted, the first heat flux sensor 20a, the thermal buffer body 21a, the second heat flux sensor 20b and the heat releasing body 22 are arranged one after another in this order from the side where the support member 403 is placed. Specifically, these components are arranged such that the support member 403 is placed at the location of the blade 1 in FIG. 2. In FIG. 15, although the control unit 30 is not particularly indicated, the control unit 30 is configured to receive the first and second sensor signals from the first and second heat flux sensors 20a, 20b of the state detection sensor 20, like in the first embodiment.

Next, the abnormality determining method of the present embodiment will be described. In the milling device S3, at the time of cutting the processing subject member 10, the blades 404a of the end mill 404 are placed in contact with the processing subject member 10 to cut the processing subject member 10. In a case of occurrence of abnormality, such as occurrence of chipping of the blade 404a of the end mill 404, the friction of the bearing 402 is rapidly increased. At this time, the abnormal heating is generated by the friction around the bearing 402. Therefore, as discussed with reference to FIGS. 7A and 7B, the heat flux, which passes through the first heat flux sensor 20a, and the heat flux, which passes through the second heat flux sensor 20b, momentarily become different from each other. Thus, the control unit 30 determines whether the sum of the voltage of the first sensor signal and the voltage of the second sensor signal is larger than the threshold value. When it is the determined that the sum of the voltage of the first sensor signal and the voltage of the second sensor signal is larger than the threshold value, the control unit 30 determines that the abnormal heating is generated at the end mill 404 (the milling device S3).

As discussed above, the abnormality determining device S2, which executes the abnormality determination of the milling device S3, can be formed with the state detection sensor 20 of the present disclosure, and the advantages, which are similar to those of the first embodiment, can be achieved.

Seventh Embodiment

A seventh embodiment of the present disclosure will be described. In the present embodiment, abnormality determination of a transporting device is executed. The rest of the present embodiment is the same as that of the first embodiment and thereby will not be described for the sake of simplicity.

Figure 16:
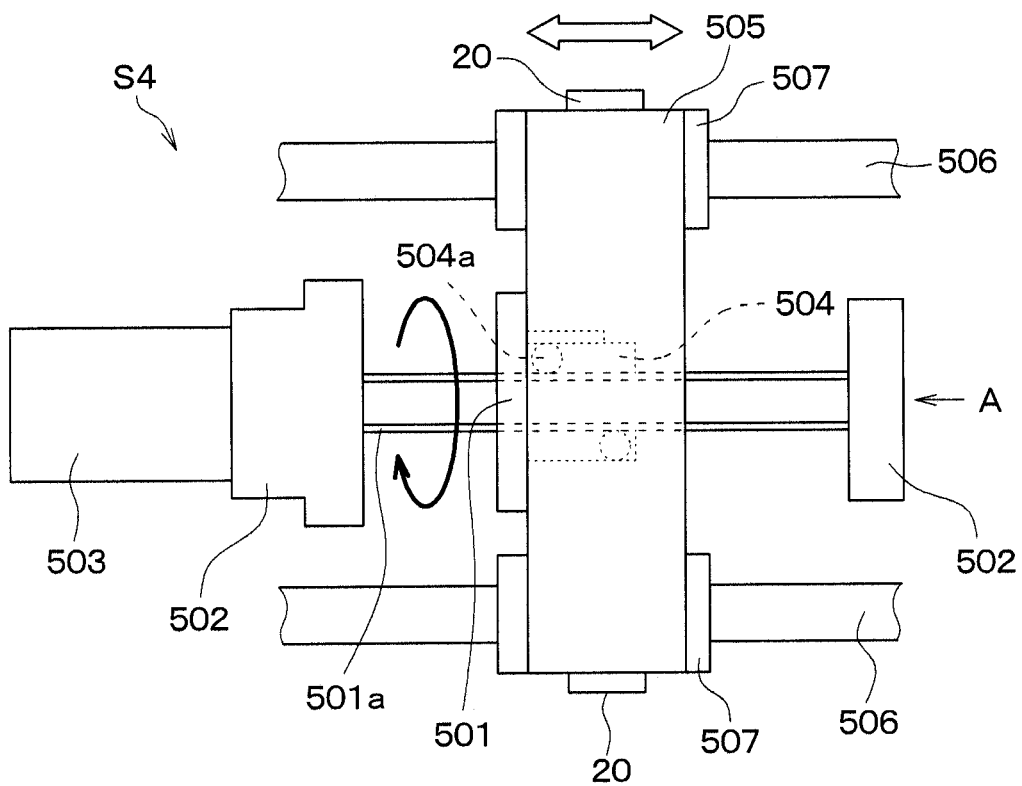
FIG. 16 is a schematic diagram showing an abnormality determining device of a seventh embodiment of the present disclosure applied to a transporting device.
Figure 17:
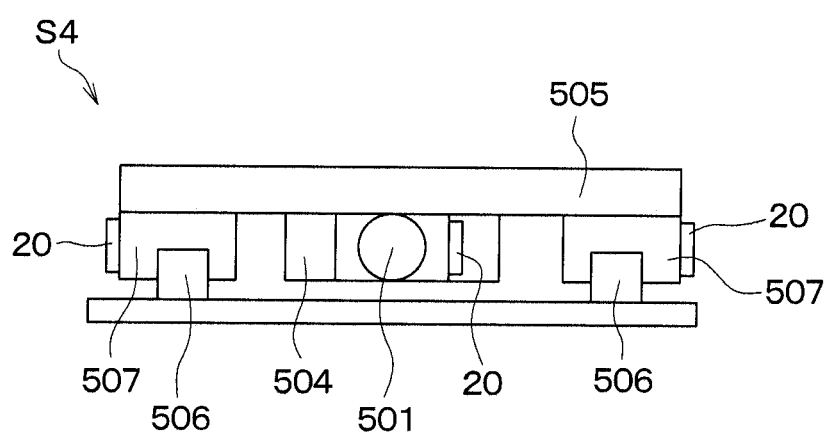
FIG. 17 is a schematic diagram showing a view taken in a direction of an arrow A in FIG. 16.

In the present embodiment, there will be described an example, in which the abnormality determining device S2 is used to determine the abnormal heating of the transporting device. As shown in FIGS. 16 and 17, the transporting device S4 includes a screw 501, support members 502 and a motor 503. The screw 501 includes a screw portion 501a. The support members 502 are installed to two axial end portions, respectively, of the screw 501. The motor 503 is installed to the support member 502. A nut 504 is paired with and is threadably installed to the screw 501 in such a manner that the nut 504 is movable in the axial direction of the screw 501. The nut 504 includes a bearing 504a and cooperates with the screw 501 to form a ball screw. The nut 504 is coupled to a pedestal 505.

The pedestal 505 is provided to carry, for example, a device to be transported. In the present embodiment, the pedestal 505 is shaped into a planar rectangular form, and a longitudinal direction of this planar rectangular form extends in a direction (a top-to-bottom direction in FIG. 16) that is perpendicular to the axial direction of the screw 501. A generally center portion of the pedestal 505 is coupled to the nut 504. Two slide blocks 507 are installed to two longitudinal end portions, respectively, of the pedestal 505. The slide blocks 507 are engaged with rails 506 respectively and are movable along the rails 506. In FIG. 17, for the purpose of easy understanding, the support members 502 are omitted.

In this transporting device S4, when the motor is rotated, the screw 501 is rotated. Thereby, the nut 504 is moved through the rotation of the screw 501. In this way, the pedestal 505 is moved integrally with the nut 504 along the rails 506 (the slide blocks 507). Thereby, the pedestal 505 can be moved to a desirable location.

The state detection sensors 20 are installed to the nut 504 and the slide blocks 507, respectively, of the transporting device S4.

In the present embodiment, the nut 504 and the slide blocks 507 respectively correspond to the sensing subject of the present disclosure. In the state detection sensor 20, although not particularly depicted, the first heat flux sensor 20a, the thermal buffer body 21a, the second heat flux sensor 20b and the heat releasing body 22 are arranged one after another in this order from the side where the nut 504 or the slide block 507 is placed. Specifically, these components are arranged such that the nut 504 or the slide block 507 is placed at the location of the blade 1 in FIG. 2. In FIGS. 16 and 17, although the control unit 30 is not particularly indicated, the control unit 30 is configured to receive the first and second sensor signals from the first and second heat flux sensors 20a, 20b of the state detection sensor 20, like in the first embodiment.

Next, the abnormality determining method of the present embodiment will be described. In the transporting device S4, when the screw 501 is rotated, the pedestal 505 is transported. However, a friction is rapidly increased in a case where a foreign object is clamped between the screw 501 and the nut 504 (the bearing 504a) or a case where the foreign object is clamped between the slide block 507 and the rail 506. At this time, abnormal heating is generated by the friction at the nut 504 or the slide block 507. Therefore, as discussed with reference to FIGS. 7A and 7B, the heat flux, which passes through the first heat flux sensor 20a, and the heat flux, which passes through the second heat flux sensor 20b, momentarily become different from each other. Thus, the control unit 30 determines whether the sum of the voltage of the first sensor signal and the voltage of the second sensor signal is larger than the threshold value. When it is the determined that the sum of the voltage of the first sensor signal and the voltage of the second sensor signal is larger than the threshold value, the control unit 30 determines that the abnormal heating is generated at the nut 504 or the slide block 507 (the transporting device S4).

As discussed above, the abnormality determining device S2, which executes the abnormality determination of the transporting device S4, can be formed with the state detection sensor 20 of the present disclosure, and the advantages, which are similar to those of the first embodiment, can be achieved.

Eighth Embodiment

An eighth embodiment of the present disclosure will be described. In the present embodiment, the heat releasing body 22 of the first embodiment is replaced with the support member 4. The rest of the present embodiment is the same as that of the first embodiment and thereby will not be described for the sake of simplicity.

Figure 18:
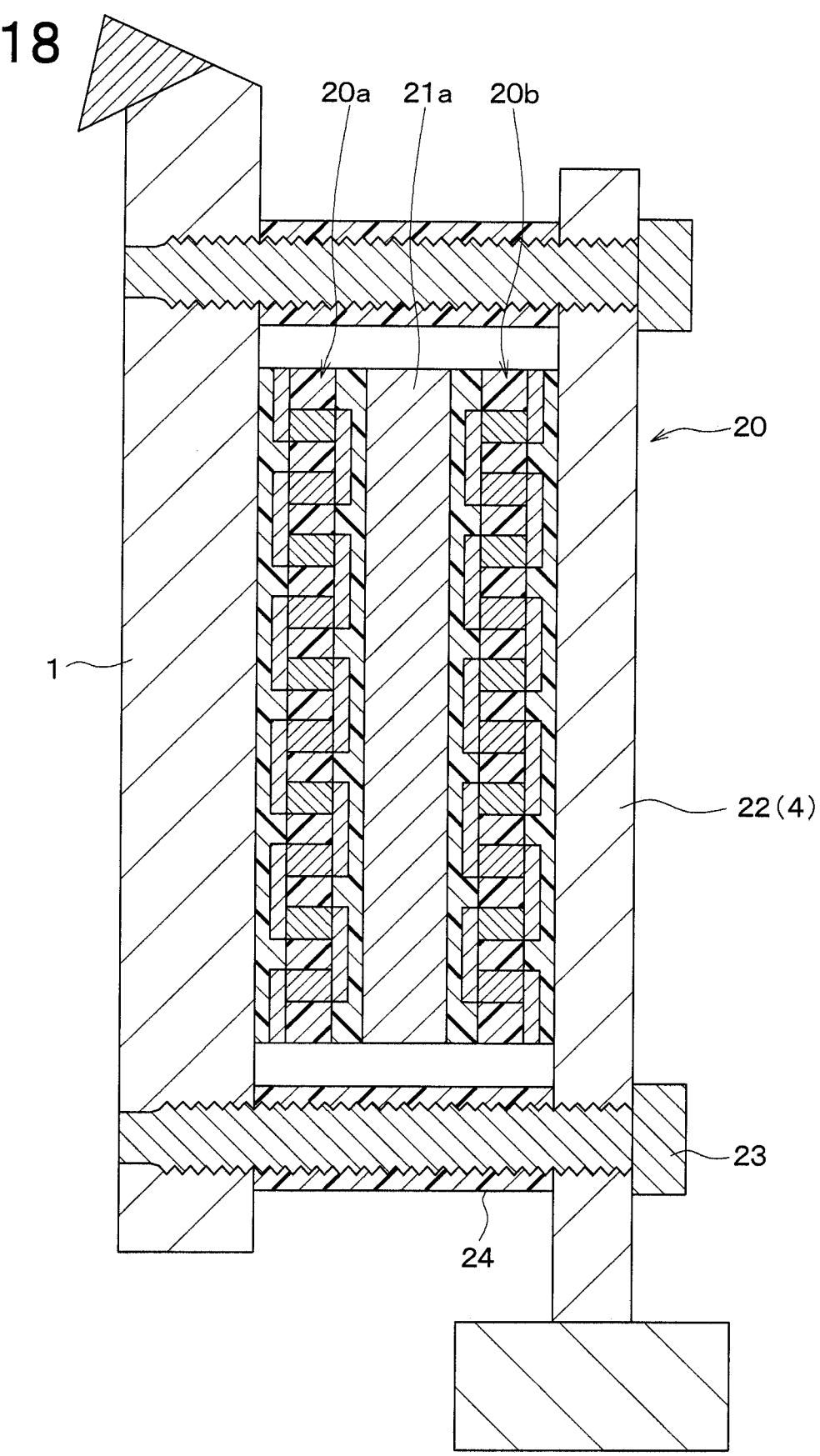
FIG. 18 is a schematic diagram showing an abnormality determining device of an eighth embodiment of the present disclosure installed to a cutting device.

In the present embodiment, as shown in FIG. 18, the blade 1 is fixed to the support member 4, which is made of Cu or Al having a predetermined heat capacity (thermal resistance) and is shaped into a planar plate form, with screws 23 such that a predetermined space is formed between the blade 1 and the support member 4. In the space between the blade 1 and the support member 4, the first heat flux sensor 20a, the thermal buffer body 21a and the second heat flux sensor 20b are arranged in this order from the blade 1 side. That is, the support member 4 is placed on the opposite side of the second heat flux sensor 20b, which is opposite from the thermal buffer body 21a. Specifically, the support member 4 of the present embodiment is made of the material, which has the predetermined heat capacity. The support member 4 fixes the blade 1 and functions as the heat releasing body 22.

In FIG. 18, although the control unit 30 is not particularly indicated, the control unit 30 is configured to receive the first and second sensor signals from the first and second heat flux sensors 20a, 20b of the state detection sensor 20, like in the first embodiment.

As discussed above, the heat releasing body 22 is formed by the support member 4, and the first heat flux sensor 20a, the thermal buffer body 21a and the second heat flux sensor 20b are placed between the blade 1 and the support member 4. Even with this structure, the advantages, which are similar to those of the first embodiment, can be achieved.

Other Embodiments

The present disclosure should not be limited to the above embodiments, and the above embodiments may be appropriately modified within the scope of the present disclosure.

In each of the above embodiments, the control unit 30 may determine a relationship between a heat flux, which is produced by converting the first and second sensor signals (electromotive voltages) into the heat flux, and a corresponding threshold value.

In each of the above embodiments, at the time of installing the state detection sensor 20 to the sensing subject, in a case where the installation location of the sensing subject, to which the state detection sensor 20 is installed, has a recess(es)/a projection(s), a cushioning material may be interposed between the installation location of the sensing subject and the state detection sensor 20 to absorb the roughness caused by the recess(es)/the projection(s).

In each of the above embodiments, the dielectric substrates 100, 200, the front surface protective member 110, 210 and the back surface protective member 120, 220 are made of the thermoplastic resin. Alternatively, the dielectric substrates 100, 200 may be made of thermosetting resin. In this way, in the step of FIG. 6(*h*), since the thermosetting resin does not flow, it is possible to limit displacement of the primary and secondary via holes 101, 102, 201, 202 in a direction of a plane of the laminated body 170. Furthermore, the thermosetting resin can serve as a flow resistance at the time of flowing the thermoplastic resin. Thus, particularly, it is possible to limit effluent of the thermoplastic resin at an outer edge portion of the dielectric substrate 100, 200. Similarly, the dielectric substrates 100, 200 may be made of the thermoplastic resin, and the front surface protective members 110, 210 and the back surface protective members 120, 220 may be made of the thermosetting resin. Alternatively, the front surface protective members 110, 210 or the back surface protective members 120, 220 may be made of the thermosetting resin. Furthermore, the dielectric substrates 100, 200, the front surface protective member 110, 210 and/or the back surface protective member 120, 220 may be made of another material that is other than the resin.

In the first embodiment, the first and second heat flux sensors 20*a*, 20*b* should not be limited to the above-described structure. It is only required that the first and second heat flux sensors 20*a*, 20*b* output a sensor signal in response to the heat flux that passes therethrough. Similarly, in each of the above embodiments, it is only required that the heat flux sensors 20*a*-20*d* output a sensor signal in response to the heat flux that passes therethrough.

In the first embodiment, the size of the planar form of the heat releasing body 22 may be modified to be substantially the same as the size of the planar form of the second heat flux sensor 20*b*, and only the back surface protective member 220 of the second heat flux sensor 20*b* may be covered with the heat releasing body 22. That is, in a view taken in the array direction (the stacking direction) of the first heat flux sensor 20*a*, the thermal buffer body 21*a*, the second heat flux sensor 20*b* and the heat releasing body 22, the heat releasing body 22 may not have a projecting portion that projects from the second heat flux sensor 20*b*. With this construction, the portion of the heat releasing body 22, which is influenced by the surrounding atmosphere, can be reduced, and thereby a change in the heat of the heat releasing body 22 caused by the surrounding atmosphere can be reduced. In a case of installing such a state detection sensor 20 to the blade 1, the locations of the front surface patterns 111, the back surface patterns 121, and the interlayer connecting members 130, 140 (the primary and secondary via holes 101, 102) may be appropriately changed such that the state detection sensor 20 is fixed to the blade 1 with the screw 23 that extend through a generally center location of each of the first heat flux sensor 20*a*, the thermal buffer body 21*a*, and the second heat flux sensor 20*b*. Similarly, in each of the second to seventh embodiments, the size of the heat releasing body 22 may be reduced.

In each of the above embodiments, the state detection sensor 20 may not be fixed to the blade 1 with the screws 23. For example, a bonding member, such as a double-sided adhesive tape or a bonding agent, may be placed between the state detection sensor 20 and the blade 1. Also, the bonding member may be placed between each adjacent two of the first heat flux sensor 20*a*, the thermal buffer body 21*a* and the second heat flux sensor 20*b*. Thereby, these components may be fixed together with the bonding members. Furthermore, in the case where the heat receiving body 25 is provided, the bonding member may be placed between the heat receiving body 25 and each of the adjacent components, which are adjacent to the heat receiving body 25.

In the fifth embodiment, the arrangement of the first and second heat flux sensors 20*a*, 20*b* may be changed such that the back surface protective member 120 of the first heat flux sensor 20*a* and the back surface protective member 220 of the second heat flux sensor 20*b* are opposed to each other, and the back surface pattern 121 of the first heat flux sensor 20*a* and the back surface pattern 221 of the second heat flux sensor 20*b* are directly connected with each other without using the external wiring 301.

Furthermore, the respective embodiments may be appropriately combined. For example, the second embodiment may be combined with any of the third to eighth embodiments to have the heat receiving body 25. In the case where the second embodiment is combined with the fourth embodiment, the heat receiving body 25 may be common to the first to ninth arrangements 40*a*-40*i*, or the heat receiving body 25 may be provided to each of the first to ninth arrangements 40*a*-40*i*.

Furthermore, the third embodiment may be combined with any of the fourth to eighth embodiments to have the third and fourth heat flux sensors 20*c*, 20*d* and the thermal buffer bodies 21*b*, 21*c*. In the case where the third embodiment is combined with the fifth embodiment, for example, the first and second heat flux sensors 20*a*, 20*b* may be formed integrally into a one-piece body, and the third and fourth heat flux sensors 20*c*, 20*d* may be formed integrally into a one-piece body, or only the first and second heat flux sensors 20*a*, 20*b* or only the third and fourth heat flux sensors 20*c*, 20*d* may be formed integrally into the one-piece body.

Furthermore, the fourth embodiment may be combined with any of the fifth to eighth embodiments to have the first to ninth arrangements 40*a*-40*i*. In the case where the fourth embodiment is combined with the fifth embodiment, in each of the first to ninth arrangements 40*a*-40*i*, the first and second heat flux sensors 20*a*, 20*b* may be formed integrally into a one-piece body, or the first and second heat flux sensors 20*a*, 20 may be formed integrally into the one-piece body in only one or some of the first to ninth arrangements 40*a*-40*i*. Furthermore, the fifth embodiment may be combined with any of the sixth to eighth embodiments to form integrally the first and second heat flux sensors 20*a*, 20*b* into a one-piece body.

In the first to fourth embodiments, the external wiring 301 connects the front surface pattern 111, which is formed at the connection terminal 601*b* of the first heat flux sensor 20*a*, to the front surface pattern 211, which is formed at the connection terminal 701*b* of the second heat flux sensor 20*b*. Alternative to this arrangement, the external wiring 301 may connect the back surface pattern 121, which is formed at the connection terminal of the first heat flux sensor 20*a*, to the back surface pattern 221, which is formed at the connection terminal of the second heat flux sensor 20*b*. Similarly, the external wiring 305 of the third embodiment may connect the back surface pattern 121, which is formed at the connection terminal of the third heat flux sensor 20*c*, to the back surface pattern 221, which is formed at the connection terminal of the fourth heat flux sensor 20*d*.

In the fifth embodiment, the first and second heat flux sensors 20a, 20b are connected with each other such that the front surface pattern 111, which is formed at the connection terminal 601b of the first heat flux sensor 20a, and the front surface pattern 211, which is formed at the connection terminal 701b of the second heat flux sensor 20b, are directly and continuously connected with each other through the front surface pattern 350, which is formed at the front surface protective members 110, 210, without using the external wiring 301. Alternative to this arrangement, one of the back surface patterns 121, which is located at the connection terminal in the first heat flux sensor 20a, may be directly and continuously connected to one of the back surface patterns 221, which is located at the connection terminal in the second heat flux sensor 20b, through a back surface pattern 450 (see FIG. 14), which is formed in the back surface protective members 120, 220 to electrically connect between the first heat flux sensor 20a and the second heat flux sensor 20b.

What is claimed is:

1. A state detection sensor that outputs a sensor signal, which corresponding to a state of a sensing subject, the state detection sensor comprising:
    a first heat flux sensor that outputs a first sensor signal, wherein the first sensor signal corresponds to a heat flux, which passes through the first heat flux sensor;
    a second heat flux sensor that outputs a second sensor signal, wherein the second sensor signal corresponds to a heat flux, which passes through the second heat flux sensor;
    a thermal buffer body that has a predetermined heat capacity; and
    a heat releasing body that has a predetermined heat capacity, wherein:
    the first heat flux sensor, the thermal buffer body, the second heat flux sensor and the heat releasing body are arranged in this order from the sensing subject side;
    the first heat flux sensor outputs the first sensor signal, which corresponds to the heat flux between the sensing subject and the thermal buffer body;
    the second heat flux sensor outputs the second sensor signal, which corresponds to the heat flux between the thermal buffer body and the heat releasing body; and
    when the heat flux, which passes through the first heat flux sensor at a time of sensing with the state detection sensor, and the heat flux, which passes through the second heat flux sensor at the time of sensing with the state detection sensor, are equal to each other, an absolute value of a voltage of the first sensor signal outputted from the first heat flux sensor and an absolute value of a voltage of the second sensor signal outputted from the second heat flux sensor are equal to each other while a polarity of the voltage of the first sensor signal and a polarity of the voltage of the second sensor signal are opposite to each other.

2. The state detection sensor according to claim 1, wherein the predetermined heat capacity of the heat releasing body is larger than the predetermined heat capacity of the thermal buffer body.

3. The state detection sensor according to claim 1, comprising a heat receiving body that has a predetermined heat capacity and is placed on an opposite side of the first heat flux sensor, which is opposite from the thermal buffer body.

4. The state detection sensor according to claim 3, wherein the predetermined heat capacity of the heat receiving body is smaller than the predetermined heat capacity of the thermal buffer body.

5. The state detection sensor according to claim 1, wherein:
    the thermal buffer body is a first thermal buffer body;
    the state detection sensor comprises:
        a third heat flux sensor that outputs a third sensor signal, wherein the third sensor signal corresponds to a heat flux, which passes through the third heat flux sensor;
        a fourth heat flux sensor that outputs a fourth sensor signal, wherein the fourth sensor signal corresponds to a heat flux, which passes through the fourth heat flux sensor;
        a second thermal buffer body that has a predetermined heat capacity; and
        a third thermal buffer body that has a predetermined heat capacity;
    the first heat flux sensor, the first thermal buffer body, the second heat flux sensor, the second thermal buffer body, the third heat flux sensor, the third thermal buffer body, the fourth heat flux sensor and the heat releasing body are arranged in this order from the sensing subject side;
    the second heat flux sensor outputs the second sensor signal, which corresponds to the heat flux between the first thermal buffer body and the second thermal buffer body;
    the third heat flux sensor outputs the third sensor signal, which corresponds to the heat flux between the second thermal buffer body and the third thermal buffer body; and
    the fourth heat flux sensor outputs the fourth sensor signal, which corresponds to the heat flux between the third thermal buffer body and the heat releasing body.

6. The state detection sensor according to claim 1, wherein the first heat flux sensor, the thermal buffer body, and the second heat flux sensor form a sensor arrangement, and the sensor arrangement is one of a plurality of sensor arrangements provided in the state detection sensor.

7. The state detection sensor according to claim 1, wherein:
    each of the first heat flux sensor and the second heat flux sensor includes a plurality of primary via holes and a plurality of secondary via holes that extend through a dielectric substrate made of thermoplastic resin in a thickness direction of the dielectric substrate, which is perpendicular to a plane of the dielectric substrate; and
    in each of the first heat flux sensor and the second heat flux sensor, a plurality of primary interlayer connecting members, each of which is made of electrically conductive metal, is embedded into the plurality of primary via holes, respectively, and a plurality of secondary interlayer connecting members, each of which is made of electrically conductive metal that is different from the electrically conductive metal of the plurality of primary interlayer connecting members, is embedded into the plurality of secondary via holes, respectively, and the plurality of primary interlayer connecting members and the plurality of secondary interlayer connecting members are alternately arranged and are connected in series through a plurality of front surface patterns, which are electrically conductive and are placed on a front surface of the dielectric substrate, and a plurality of back surface patterns, which are electrically conductive and are placed on a back surface of the dielectric substrate.

8. The state detection sensor according to claim 7, wherein in each of the first heat flux sensor and the second heat flux sensor, at least one of the electrically conductive metal, which forms the plurality of primary interlayer connecting members, and the electrically conductive metal, which forms the plurality of secondary interlayer connecting members, is a sintered alloy that is solid-state sintered in a state where a plurality of metal atoms maintain a crystalline structure of the plurality of metal atoms.

9. The state detection sensor according to claim 7, wherein:
   the first heat flux sensor and the second heat flux sensor are formed integrally into a one-piece body; and
   one of the plurality of front surface patterns of the first heat flux sensor is directly connected to one of the plurality of front surface patterns of the second heat flux sensor, or one of the plurality of back surface patterns of the first heat flux sensor is directly and continuously connected to one of the plurality of back surface patterns of the second heat flux sensor to electrically connect between the first heat flux sensor and the second heat flux sensor.

10. The state detection sensor according to claim 7, wherein the thermal buffer body is a one-piece metal plate that extends continuously through an extent that is equal to or larger than a sensing range, which includes all of the plurality of primary interlayer connecting members and the plurality of secondary interlayer connecting members formed in the dielectric substrate of the first heat flux sensor, in a plane that is parallel to a plane of the dielectric substrate of the first heat flux sensor and a plane of the dielectric substrate of the second heat flux sensor.

* * * * *